(12) United States Patent
Chen

(10) Patent No.: US 11,438,148 B2
(45) Date of Patent: *Sep. 6, 2022

(54) QUANTUM COMPUTING-THREAT-RESISTANT METHOD AND SYSTEM FOR USE ON CRYPTOGRAPHY KEY EXCHANGING PROCESSES

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 21 days.

This patent is subject to a terminal disclaimer.

(21) Appl. No.: 17/211,869

(22) Filed: Mar. 25, 2021

(65) Prior Publication Data

US 2021/0306146 A1 Sep. 30, 2021

Related U.S. Application Data

(63) Continuation-in-part of application No. 16/885,312, filed on May 28, 2020, now Pat. No. 11,218,303.

(30) Foreign Application Priority Data

Mar. 27, 2020 (TW) .................. 109110653

(51) Int. Cl.
 *H04L 9/06* (2006.01)
 *H04L 9/08* (2006.01)
 *H04L 9/30* (2006.01)

(52) U.S. Cl.
CPC .......... *H04L 9/0855* (2013.01); *H04L 9/0637* (2013.01); *H04L 9/0838* (2013.01); *H04L 9/0869* (2013.01); *H04L 9/3066* (2013.01)

(58) Field of Classification Search
CPC ... H04L 9/0855; H04L 9/0637; H04L 9/0838; H04L 9/0869; H04L 9/3066; H04L 9/0852; H04L 9/0662
See application file for complete search history.

(56) References Cited

U.S. PATENT DOCUMENTS

| | | | |
|---|---|---|---|
| 7,324,647 B1 * | 1/2008 | Elliott | H04B 10/70 370/390 |
| 10,250,387 B1 * | 4/2019 | Guerin | G09C 1/00 |
| 10,708,046 B1 * | 7/2020 | Ashrafi | H04L 9/0841 |
| 10,742,420 B1 * | 8/2020 | Griffin | H04L 9/0861 |

(Continued)

*Primary Examiner* — Baotran N To

(57) ABSTRACT

A quantum computing-threat-resistant system for cryptography key exchange comprises a linear-space computing module, a manifold computing module, and a Banach-space computing module. The system implements the technologies of homotopy morphing and key cloaking for facilitating the key-exchanging processes to perform quantum computing-threat-resistant operations in a mathematics space which is different from the spaces that generic quantum attacks work on, and then retrieve the original key in a Hilbert space after the processes of key exchange. The system not only avoids quantum attacks on key-exchanging processes, but also avoids the defects of current PQC solutions, the vulnerability of the main streamed symmetric & asymmetric encryption systems, and the limitation of quantum key operation in a Hilbert space. Both legacy key solution and quantum key solution are provided and implemented without requiring expensive devices.

13 Claims, 23 Drawing Sheets

(56) References Cited

U.S. PATENT DOCUMENTS

| | | | |
|---|---|---|---|
| 10,817,590 B1* | 10/2020 | Daly | H04W 12/041 |
| 11,218,303 B2* | 1/2022 | Chen | H04L 9/0662 |
| 2005/0036624 A1* | 2/2005 | Kent | H04L 9/0858 |
| | | | 380/277 |
| 2020/0044832 A1* | 2/2020 | Zhang | H04L 9/3073 |
| 2021/0119777 A1* | 4/2021 | Ghosh | H04L 9/0643 |
| 2021/0203493 A1* | 7/2021 | Chen | G06F 17/14 |
| 2021/0226782 A1* | 7/2021 | Florit | H04L 9/0869 |
| 2021/0306144 A1* | 9/2021 | Chen | H04L 9/3066 |

* cited by examiner

```
┌─────────────────────────────────────────────┐
│ Maps the data formed in a normed vector space from an │
│ inner-product space to a Hilbert space, so as to retrieve │──── F309
│ the original cryptography key information which is │
│ delivered with the form of the first manifold data │
└─────────────────────────────────────────────┘
                        ▲
┌─────────────────────────────────────────────┐
│ Performs linear operations through a dual vector space │
│ with the basis of the Banach space to switch the third │──── F308
│ geometric data from the form of the weak-star topology │
│ to the form of a normed vector space │
└─────────────────────────────────────────────┘
                        ▲
┌─────────────────────────────────────────────┐
│ Performs a sub-reflexive Banach operation on the second │
│ geometric data for further confirming whether the second │
│ geometric data in the form of a curved surface is │
│ differentiable, and then perform operations of │
│ dimensionality reduction and mapping process with only │──── F307
│ retaining its weak metric attributes to avoid missing │
│ important information if the second geometric data is │
│ differentiable, and then to derive third geometric data in │
│ the form of weak*topology │
└─────────────────────────────────────────────┘
                        ▲
┌─────────────────────────────────────────────┐
│ Checks the result of mapping the second geometric data │
│ from a form of curved surface to a form of super-reflexive │
│ Banach space, and confirms whether the curved-surface │──── F306
│ switching processes in a uniformly convex space fits │
│ duality and reversibility, so as to confirm whether the │
│ derived second geometric data is applicable │
└─────────────────────────────────────────────┘
                        ▲
┌─────────────────────────────────────────────┐
│ Expresses the first geometric data in view of a │
│ uniformly convex Banach space, and switches it into │──── F305
│ a form of curve surface as a second geometric data │
└─────────────────────────────────────────────┘
                        ▲
┌─────────────────────────────────────────────┐
│ Performs operations of Riemann integration on the │
│ dimension-reduced data so as to switch it from the form of Peano │──── F304
│ curve into a first geometric data which is in form of a plane │
└─────────────────────────────────────────────┘
                        ▲
                       F303
```

FIG. 11B

QUANTUM COMPUTING-THREAT-RESISTANT METHOD AND SYSTEM FOR USE ON CRYPTOGRAPHY KEY EXCHANGING PROCESSES

CROSS-REFERENCE TO RELATED APPLICATION

This application is a continuation-in-part patent application of U.S. application Ser. No. 16/885,312 filed on May 28, 2020, which claims priority to Taiwanese Patent Application No. 109110653 filed on Mar. 27, 2020, the entire contents both of which are hereby incorporated by reference for which priority is claimed under 35 U.S.C. § 120.

BACKGROUND OF THE INVENTION

1. Field of the Invention

The present invention relates to a quantum computing-threat-resistant system, and in particular, to a system or solutions with procedures or methods that include homotopy morphing and functional mapping which is compatible with legacy channels and quantum channels to facilitate and enhance the cryptography key exchange processes.

2. Description of the Related Art

Conventional PQC (post quantum cryptography) technologies use hyper complicated encryption systems (such as Lattice, Code-based, Supersingular Elliptic Curve Isogency, etc.) to implement quantum computing-threat-resistant operations for key transmission processes. Security risks depend on the quantum channel related factors including the specification (such as Q-bits) of the quantum computers used on the attacker side, and the accuracy of quantum steering. Thus, the majority of current PQC solutions still have the following basic defects, including: 1) lack of a verification mechanism through inverse operation that cannot ensure the correctness and success rate for key derivation; 2) lack of lightweight design on transmission architecture that is not conducive to mass data transmission with IOT devices operating on current bandwidth; 3) lack of stability on the encryption strength of several PQC schemes. This not only increases the difficulty of quality assurance, but also affects the accuracy of the decryption processes; 4) replacement issues on many existing HTTP web servers that are caused by greatly increasing data traffic due to handshaking, encryption, and decryption mechanisms required by protocol for the PQC systems; 5) various encoding mapping issues with file transfer protocol where the issues are caused by the data scheme of the PQC system (such as Elliptic Curve, Lattice, etc.) and may lead to incorrect termination of transferred files, or even more exposure to being compromised by quantum computing attack when small messages are transferred; 6) issues on multiple possible solutions where the issues are usually caused by the ElGamal cryptography systems that cannot effectively determine the optimal solution when multiple possible solutions can be derived. Moreover, several current PQC schemes need to eliminate legacy keys, and cannot effectively utilize both legacy keys and quantum keys within the same system. Unfortunately, there are many practical restrictions to the industrial applicability of the conventional methods and systems.

However, even though there are still a few PQC solutions which could be compatible with the legacy keys, vulnerabilities or threats in current symmetric and asymmetric cryptography key systems cannot be effectively avoided. For example: 1) data transmission can only be performed in legacy channels; 2) most of the random number generation mechanisms adopt a pseudo random number generator, and such function library is easily compromised; 3) the current response mechanism for events about certificates being stolen are unsound; 4) applicable primes to current symmetric and asymmetric key systems are also mostly mastered by attacker groups, and looking for greater applicable primes will also lead to system performance issues; and 5) most importantly, to many of the conventional modulus arithmetic mechanisms in a quantum channel, no matter modular parameters or library related configurations are prone to be discovered under a period of brute-force quantum attacks or analysis via quantum cloning.

Furthermore, the current quantum cryptography key system implemented with known QKD (quantum key distribution) technology is usually operated with some restrictions due to performing the computing processes in a Hilbert space. For example: 1) in a Hilbert space, only a few known defined metrics can be applied; 2) in addition, its matrix operation must use orthonormal basis, which will increase the possibility of brute-force cracking by quantum computing attacks; 3) especially due to the restricted scope related to the physical properties of quantum itself, the amount of applicable operators in a Hilbert space is even rarer. As a result, the above relevant restrictions are not conducive to the current published quantum cryptography key system to perform quantum attack-resistant operations in a Hilbert space.

Therefore, it is desirable to have improvements on the conventional PQC approach.

BRIEF SUMMARY OF THE INVENTION

In view of the drawbacks of the prior art, it is an object of the present invention to provide a quantum attack-resistant system to facilitate and enhance processes of cryptography key exchange, wherein the system can perform some quantum attack-resistant operations coupled to the key exchange processes to prevent the legacy key or the quantum key via being compromised by quantum computing operations after an interception on key exchange processes. In accordance with this invention, even if a generic legacy key is used, the risk of a system being compromised by quantum computing attacks can be effectively reduced during the key exchange processes based on the embodiments of the present invention. The related technologies can be implemented as a device or an electronic system with reasonable cost, and can avoid a large amount of capital expenditure on eliminating the legacy key system in a short period. At the same time, the present invention effectively avoids the defects of implementation in the prior PQC solutions, the vulnerabilities of symmetric and asymmetric encryption systems on the market, and the operating restrictions of quantum keys in a Hilbert space.

To achieve the above objects and more, the present invention provides a solution for use on cryptography key-exchanging processes (no matter for legacy key or quantum key) to resist brute-forcing threats launched with quantum computing means. Wherein the solution (or a system) is implemented with the following methods and dataflow: a) first, leveraging a combination of linear-space computing and operation in accordance with the data type of a quantum cryptography key or a legacy cryptography key which is operated in a Hilbert space; wherein the computing and operation optionally performs instructions of quantum operation, commutative operation, primitive-root computing, and arithmetic computing, for performing simulations of quantum logic gates, operations of cyclic groups, and modular arithmetic of polynomials; so as to re-encode a quantum key or a legacy key on hand in a proprietary way to derive a proprietary encoded data equivalent to the cryptography key information; b) thereafter, leveraging homotopy-morphing computing means and key-cloaking computing means to switch the encoded data of key information to an output data of switched key formed with high-strength security; wherein the homotopy-morphing computing means relate to manifold computing and operation, and the key-cloaking computing means relate to time-variant function mapping and operation; c) moreover, according to the data source of the above-mentioned switched key, leveraging partial differential equation of a time-variant function or encryption with complex-plane transform, so as to switch the output data into an encrypted form for security transmission; wherein the data in a form for security transmission cannot be compromised by inverse operations, can be authenticated, can be verified for completeness of data transmission, and can protect being cracked from functional analysis; d) considering further, for the above-mentioned output data derived by homotopy-morphing computing means or key-cloaking computing means, before being switched into an encrypted form for security transmission, capable of treating the output data as a manifold form; meanwhile leveraging operations of data type switching in a Banach space, so as to switch the data from a form of manifold in a topology space into a form of a Peano curve in a Banach space; e) after receiving the encrypted data for security transmission and decrypting it, the receiver side retrieving the data in a form of a Peano curve, and then switching it from a form of a Peano curve in a Banach space into a form of a Hilbert space; so as to retrieve the encoded data of key information based on a manifold data type; and then f) retrieving the original key information from the encoded data for a quantum key or a legacy key. Thus, that will achieve the effect of avoiding brute-forcing performed with quantum computing.

It is to be noted that the following mentioned modules, units, sub-units, filters, savers, converters, or calculators are equivalent to a set of loadable software libraries or instructions with coded algorithm stored in a non-volatile memory, which can be re-accessed for performing a series of subroutines step by step.

In order to implement the above-mentioned methods and dataflow, the present invention provides an embodiment for use over a key-exchanging device or system to resist quantum computing threats which performs brute-forcing attacks. This embodiment implement a system which includes a linear-space computing module, and the linear-space computing module comprises: a quantum-operator-integration computing unit which supports basic quantum operations in a linear space; a commutative-operator processing unit which maintains the completeness of the original cryptography key information; a primitive-root generator unit for deriving applicative cyclic group in a linear space; a quantum-random-bit generator unit which provides true randomness for the primitive-root generator unit; and an advanced-arithmetic computing unit for providing computing capability of modulo powers for data formed with algebraic structures.

In an embodiment, the quantum-operator-integration computing unit performs basic quantum operations in a linear space, wherein the operations comprise: 1) performing unitary transformation for linear matrices; 2) performing a dimension-reduction process on a unitary matrix in hyperspace; 3) performing a verification of orthonormality for the bases of a vector space; 4) performing inner product operations for a vector space; 5) performing an eigenization process for a vector space so as to derive a corresponding eigen value and eigen vector; 6) checking whether a quantum operator for use is a Hermitian operator; 7) finding the quantum transition probability for a ground state via analysis on collision cross section; 8) leveraging Laplace transform to derive wave vectors which are perpendicular with each other in a vector space; and 9) making use of applicable conversion operators to switch a vector space to a conjugated complex space. The above computing unit and operations can be implemented, based on relevant technology, as a software unit, hardware unit, or a combination of software and hardware units. However, implementing the above quantum operations with a quantum-operator-integration computing unit, results in a synergy that can provide various switching processes with basic quantum operations in the linear space efficiently, and ensure the correctness of the switching processes performed by the quantum operations.

In an embodiment, via performing a commutative-operator processing unit, the result of related switching processes with the operators mentioned in the above quantum-operators-integration computing unit will be determined whether there is a degeneration issue with the eigen value of quantum key states, and then this processing unit leverages C.S.C.O. (complete set of commuting observables) to recover this issue, so as to maintain the completeness of the original cryptography key information, wherein the operations performed by the commutative-operator processing unit comprise: 1) performing non-orthogonal conversion on the observed quantum states to derive eigen states projected on an orthogonal coordinate system first; 2) validating whether a Hermitian transform is applicable for the derived eigen states; 3) performing phase correction on the derived eigen states if any degenerated state is found after Hermitian transform; 4) making use of C.S.C.O. (complete set of commuting observables) to recover the degenerated state if there is still degenerated state after performing phase correction. After that, the recovered completed result will be coupled to both of the primitive-root generator unit and the quantum-random-bit generator unit of the linear-space computing module, to derive the applicative algebraic cyclic group in the linear space with true randomness.

In an embodiment, the above-mentioned advanced-arithmetic computing unit comprises: an algebraic-ring computing sub-unit, a Galois-group computing sub-unit, and a root modulo powers of squaring process sub-unit. Wherein, the algebraic-ring computing sub-unit provides dual operators to support maintenance and computing processes for data on an algebraic ring; the Galois-group computing sub-unit provides modular arithmetic of polynomial for deriving applicable Galois group and performing computing processes for it; and the root modulo powers of squaring process sub-unit makes use of Euler's theorem and Fermat's little theorem to support squaring processes for root modulo powers. Combining these sub-units in an implementation of software, hardware, or a combination of software and hardware as an advanced-arithmetic computing unit provides secure algebraic operations with high complexity, and facilitates simplification and increases efficiency of the computing processes of root modulo powers.

In an embodiment, the system of the present invention further includes a manifold computing module comprising a switching-operation & mapping-process unit and a key transmission unit. Wherein, the switching-operation & mapping-process unit is for performing manifold topology operations on a cryptography key to derive a switched key data. The switching-operation & mapping-process unit comprises: 1) a homotopy-morphing computing unit for performing homotopy morphing operations on a legacy key or a quantum key, wherein the operation makes use of metrics in an mathematics space to express the encoded data of key information, and then performs dimension switching processes, so as to derive a homotopy-morphed key data as the switched key data; wherein the switched key data is in a form of a Calabi-Yau manifold; and 2) a key-cloaking computing unit, for performing cloaking process on a quantum key, or on a homotopy-morphed key data derived from a homotopy-morphing computing unit, wherein the cloaking process makes use of phase-space modeling and time factors to implement block cipher, so as to derive a cloaked key data as the switched key data; wherein the switched key data is formed with parameters of a time-variant heat kernel function implying key states or key information of a cryptography key.

Thereafter, the key transmission unit maps the switched key data on a transmitter side to a data type in a form for security transmission, or receives and decrypts the data in a form for security transmission on a receiver side, so as to facilitate and enhance key-exchanging processes. In order to facilitate and enhance quality of quantum communication as well, the key transmission unit further comprises: a quantum steering sub-unit which is for a quantum channel to perform quantum communication with quantum steering mechanism; and a Bell measurement sub-unit for confirming whether there is a decoherence issue with current quantum communication in a quantum channel, so as to depress the probability of an occurrence related to invalid quantum teleportation In an embodiment, the above-mentioned homotopy-morphing computing relates to mapping processes with algebraic data structures based on homotopy morphing operations, and the operations are performed by a homotopy-morphing computing unit, wherein the operations comprise: 1) leveraging metric tensor of a pseudo-Riemannian manifold to switch an encoded data of key information into a Lorentzian manifold model, so as to derive an encoded data in a form of a Lorentzian manifold; 2) leveraging operations of differential manifold to promote the metrics of a Lorentzian manifold to a Finsler space, so as to switch the encoded data from a form of a Lorentzian manifold to a form of a Finsler manifold; 3) leveraging Calabi-Yau quantic polynomial to switch the encoded data from the form of a Finsler manifold in a complex three-dimension space to a form of a Calabi-Yau manifold; and 4) verifying whether the encoded data in the form of a Calabi-Yau manifold is applicable in a form of a parallelizable manifold as well, so as to confirm whether the final result of homotopy-morphing computing is applicable. Combining the above operations in an implementation of software, hardware, or a combination of software and hardware as a homotopy-morphing computing unit can provide the function of homotopy morphing to switch the form of a legacy key to the form of a topology space. Such switching processes of homotopy morphing can make quantum computing operations fail to analyze a cryptography key in a Hilbert space during the key-exchanging processes.

In an embodiment, the above-mentioned key-cloaking computing relates to data mapping processes and block cipher operations via making use of mathematics spaces and time factors, and the processes and operations are performed by a key-cloaking computing unit. Wherein, the processes and operations comprise: 1) performing Symplectic manifold modeling with phase spaces on the encoded data of quantum key states, so as to derive a linear Symplectic space model for expressing the encoded data which is corresponding to the combination of quantum key states; 2) performing verifications on the combination of the quantum key states to discard decoherent quantum states meanwhile to avoid using a quantum state which occurs with low probability; 3) retaining significant information which is on a non-manifold edge, after conformal mapping operations on the encoded data which is corresponding to the combination of quantum key states; and 4) leveraging Dirac $\delta$-function coupled to a Laplace operator, so as to switch the encoded data from a form of a linear Symplectic space model into a form of a time-variant Jacobi $\theta$ function, for achieving the effect of cloaking the quantum key. Combining these processes and operations in an implementation of software, hardware, or a combination of software and hardware as a key-cloaking computing unit can achieve the effect of cloaking the quantum key to switch the form of a quantum key to the form of a heat kernel function. Such switching processes of key cloaking will make quantum computing operations fail to find the quantum key states during the key-exchanging processes.

In another embodiment, in order to ensure the correctness and success rate of key-cloaking computing performed by the transmitter and receiver over a key-exchanging process, wherein the key-cloaking computing unit of the manifold computing module further comprises: 1) a quantum-decoherence filter which makes use of Hermitian transform for filtering out decohered quantum states; 2) a probability-threshold sifter for sieving the quantum states whose probability of occurrence is higher than a configured threshold based on a corresponding wave function; and 3) an information retainer for retaining significant information which is on a non-manifold edge, after conformal mapping operations on the encoded data which is corresponding to the combination of quantum key states. Combining these elements in an implementation of software, hardware, or a combination of software and hardware as a filter-and-retainer sub-unit can ensure the accuracy and success rate for the key cloaking computing processes on the transmitter side and the receiver side during the key-exchanging processes.

Thereafter, in an embodiment, the above-mentioned key transmission unit of the manifold computing module adopts corresponding enhancements on key-exchanging processes in accordance with the data source of the switched key, the enhancements comprise: 1) operations to enhance the legacy key-exchanging processes, for a switched key data derived from the homotopy-morphing computing unit of the manifold computing module; wherein the operations switch the switched key data from a form of a manifold into a form of integral data derived with an integral equation of a curvature polynomial, parameterize the curvature polynomial expressed for the integral data, and then make use of a partial differential equation evoluted over time, so as to facilitate and enhance the key-exchanging processes via a legacy communication channel; 2) operations to enhance the quantum key-exchanging processes, for a switched key data derived from the key-cloaking computing unit of the manifold computing module; wherein the operations switch the key data with a form of numeric pairs to a complex plane derived by an infinite iteration process, wherein the mentioned switched key data is cloaked in a heat kernel function and is corresponding to the combination of the quantum key states; based on the numeric pairs, to find the non-trivial zeros closed to the corresponding coordinates of the complex plane, and then make the set of all corresponding non-trivial zeros, the numeric pairs on the complex plane and the derived parameters of the complex plane, be coupled to a super-singular elliptic curve for performing encryption processes, so as to facilitate and enhance key-exchanging processes and key authentication.

In an embodiment, in order to implement the above-mentioned corresponding enhancements on key-exchanging processes, the above-mentioned key transmission unit of the manifold computing module comprises a legacy key-exchanging sub-unit and a quantum key-exchanging sub-unit. Wherein, the legacy key-exchanging sub-unit includes the following components: 1) a topology surface switching processor to process manifold data derived from the homotopy-morphing computing unit so as to makes use of the Chern-Gauss-Bonnet theorem to switch the manifold data from a form of a closed even-dimensional Riemannian manifold to a form derived with the integral equation of the curvature polynomial; and 2) a nonlinear partial differential processor for delivering all the curvature parameters of the curvature polynomial via various nonlinear parabola partial differential equations evoluted over time. Combining these elements in an implementation of software, hardware, or a combination of software and hardware into a legacy key-exchanging sub-unit can achieve the effect of facilitating and enhancing the key-exchanging processes, to switch the homotopy-morphed legacy key or the quantum key from a form of the manifold to a form derived with the integral equation of the curvature polynomial, furthermore, to parameterize the integral equation into the switched form with time-variant function, and then to make use of the switched form as a partial differential equation evoluted with time intervals, to facilitate and enhance the processes of key exchange within a legacy channel. Meanwhile, the integration of the above homotopy-morphing computing unit and the legacy key-exchanging sub-unit also effectively avoids the vulnerabilities usually caused by conventional legacy symmetric or asymmetric cryptography key systems during the key-exchanging processes.

Moreover, in order to facilitate and enhance the key-exchanging processes in a quantum communication channel, the above-mentioned quantum key-exchanging sub-unit performs a set of operations as a pre-process before transmitting the data to a receiver, wherein the operations include: 1) switching the data of quantum key states cloaked in a form of heat kernel function to a complex plane of a Mandelbrot set which is generated by an infinite-iteration process; so as to make the data of key information as a set of numeric pairs expressed by the coordinate of the complex plane, wherein the cloaked data is corresponding to a combination of quantum key states; 2) finding the non-trivial zeros which are closed to a Riemann zeta function under Riemann hypothesis in accordance with a complex quadratic polynomial, wherein the complex quadratic polynomial is expressed for the edge of fractals on the complex plane of the Mandelbrot set; 3) selecting an applicable super-singular elliptic curve, and using super-singular primes which fit a Galois group as generation points to derive encryption parameters for use in simulation of the ElGamal encrypt algorithm; so as to encrypt the complex quadratic polynomial, the set of corresponding non-trivial zeros, and the relation between the set of non-trivial zeros and the set of switched numeric pairs; 4) generating twin primes which fit a form of twin prime conjecture in accordance with the primes mapped from the found non-trivial zeros; and then in accordance with the primes mapped from the found non-trivial zeros and the corresponding generated twin primes, constructing a square matrix for use in modular operations; and 5) performing inverse operation for verification on the receiver side with the received primes and the modular square matrix which is derived on the transmitter side, so as to confirm the correctness of the encrypted data exchange. A combination of the above operations in an implementation of software, hardware, or a combination of software and hardware as a quantum key-exchanging sub-unit can achieve the effect of facilitating the key-exchanging processes, to switch the numeric pairs to a complex plane generated by an infinite-iteration process, wherein the numeric pairs are formed from the quantum key states cloaked in a heat kernel function; thereby to find the non-trivial zeros closed to the corresponding coordinates of the complex plane, and then to make the set of all corresponding non-trivial zeros, the numeric pairs on the complex plane and the derived parameters of the complex plane, be coupled to a super-singular elliptic curve for performing encryption processes to facilitate and enhance the processes of cryptography key exchange and authentication. This sub-unit helps to provide convenience and security for a generic quantum key during the key-exchanging processes, and this sub-unit can be implemented through a device with reasonable cost. Meanwhile, an integration of the above-mentioned key-cloaking computing unit and the quantum key-exchanging sub-unit also effectively avoids several defects of conventional PQC solutions during the key-exchanging processes.

In another embodiment, the system of the present invention further includes a Banach-space computing module which performs a set of operations to switch a homotopy-morphed data or a cloaked data to a data in a form of a Banach space before the pre-process performed by the above-mentioned key transmission unit on the transmitter side, and then switch the data formed in a Banach space to a data in a form of a Hilbert space on the receiver side, for retrieving the original key information in a Hilbert space. Wherein the homotopy-morphed data or the cloaked data is treated as a first manifold data in a topology space, and the operations on the transmitter side include: 1) leveraging Theorema Egregium to switch a first manifold data from a form of a topology space into a form of a Banach space, so as to derive a second manifold data; wherein the first manifold data is formed with a manifold in a topology space and the second manifold data is formed with a manifold in a Banach space; 2) leveraging an isometric approximation method to find the corresponding minimum isomorphic commutative group based on the second manifold data; 3) performing a smooth topological space verification through the operations of Cauchy inequality to check the convergence on the minimum isomorphic commutative group for confirming the correctness of the data switching from the form in the topology space to the form in the Banach space; 4) performing a dimension-reducing process through iterative operations on the commutative group derived from the second manifold data, and switching it from a form in a multi-dimensional Banach space into a form of a Peano curve in a one-dimensional space.

After completing a security transmission with the above-mentioned key transmission unit from a transmitter to a receiver and then retrieving the data in a form of a Peano curve, the other operations performed by the Banach-space computing module on the receiver side include: 1) leveraging operations of Riemann integration to switch the received data from the form of a Peano curve into a first geometric data which is in a form of a plane; 2) expressing the first geometric data in view of a uniformly convex Banach space, and switching it into a form of curve surface as a second geometric data; 3) checking the result of mapping the second geometric data from a form of a curved surface to a form of a super-reflexive Banach space, and confirms whether the curved-surface switching processes in a uniformly convex space fits duality and reversibility, so as to confirm whether the derived second geometric data is applicable; 4) performing a sub-reflexive Banach operation on the second geometric data for further confirming whether the second geometric data in the form of a curved surface is differentiable; and then perform operations of dimensionality reduction and mapping process with only retaining its weak metric attributes to avoid missing significant information if the second geometric data is differentiable, and then to derive third geometric data in a form of a weak-star topology; 5) performing linear operations through a dual vector space with the basis of the Banach space to switch the third geometric data from the form of the weak-star topology to the form of a normed vector space; and 6) mapping the data formed in a normed vector space from an inner-product space to a Hilbert space, so as to retrieve the original cryptography key information which is encoded within the form of the first manifold data.

A combination of the above operations in an implementation of software, hardware, or a combination of software and hardware as a Banach-space computing module can achieve the effect of key space switching, to be coupled to the manifold computing module to facilitate the quantum computing-threat-resistant operations for key exchange in the topology spaces, wherein the operations perform to switch the first manifold data from a topology space through a Banach space to a Hilbert space, for retrieving the original key information, thereby to support generic key-exchanging processes. That will make a generic quantum computing in a Hilbert space fail to get involved in the key-exchanging processes enhanced by the embodiments of the present invention. Meanwhile, to a quantum cryptography system, the further integration of the above Banach-space computing module, key-cloaking computing unit, and the quantum key-exchanging sub-unit also effectively avoids several restrictions due to the operations in a Hilbert space during the key-exchanging processes.

Thereby, based on means of key homotopy-morphing, key cloaking, Banach-space computing, and so on, the above embodiments of the present invention can be implemented as a full threat-resistant mechanism on quantum brute-forcing attacks during quantum or legacy key-exchanging processes. The present invention can be implemented as a quantum attack-resistant device or system with high-strength security, and can be implemented on the transmitter side and the receiver side for data communication. In some embodiments, the present technology can be compatible with the operations of legacy cryptography key and quantum cryptography key in different mathematics spaces. That not only effectively avoids generic quantum computing attacks during the key-exchanging processes, but also can be implemented by devices with reasonable cost. It facilitates overcoming the bottleneck related to the requirement of heavy-cost devices for most of prior PQC solutions, and also avoids the defects of current PQC solutions, the vulnerabilities of the main streamed symmetric & asymmetric encryption systems, and the restrictions of quantum key operation in a Hilbert space.

In addition, in some embodiments, in the above-mentioned quantum computing-threat-resistant system for use on cryptography key-exchanging processes, in the switching-operation & mapping-process unit of the manifold computing module, the key-cloaking computing unit is optional. For example, in the switching-operation & mapping-process unit of the manifold computing module, if the switching-operation & mapping-process unit only implements the homotopy-morphing computing unit without implementing the key-cloaking computing unit, the coupled linear-space computing module does not need to implement the quantum-operators-integration computing unit and the commutative-operator processing unit. For example, in the switching-operation & mapping-process unit of the manifold computing module, if the switching-operation & coupling-process unit only implements the homotopy-morphing computing unit, the above-mentioned key transmission unit of the manifold computing module can include the legacy key-exchanging sub-unit without implementing the quantum key-exchanging sub-unit.

In addition, in some embodiments, in the above-mentioned quantum computing-threat-resistant system for use on cryptography key-exchanging processes, in the switching-operation & mapping-process unit of the manifold computing module, for a quantum cryptography key, the homotopy-morphing computing unit and the key-cloaking computing unit can be used in combination. A quantum cryptography key can be performed with the processes of homotopy morphing first, and then with the processes of key cloaking, and finally perform the processes of the quantum key-exchanging sub-unit to complete the mechanism with highest-strength security.

In addition, in some embodiments, in the above-mentioned quantum computing-threat-resistant system for use on cryptography key-exchanging processes, in the switching-operation & mapping-process unit of the manifold computing module, for a quantum cryptography key, can be implemented only by coupling the homotopy-morphing computing unit for use without the key-cloaking computing unit. A quantum cryptography key can be performed only with the processes of homotopy morphing, and then perform the processes of the legacy key-exchanging sub-unit to avoid known malicious detection in the quantum channels.

BRIEF DESCRIPTION OF THE DRAWINGS

FIG. 11B is a dataflow diagram continuation of FIG. 11A of a Banach-space computing module according to an embodiment of the present invention.

DETAILED DESCRIPTION OF THE INVENTION

To facilitate understanding of the objects, characteristics and effects of this present disclosure, embodiments together with the attached drawings for the detailed description of the present disclosure are provided.

A plurality of embodiments in regard to a quantum computing-threat-resistant system or implemented as a device for key-exchanging processes which can be compatible with legacy key or quantum key for operations in different mathematics spaces to facilitate completion of secure key-exchanging processes are provided as follows. In an embodiment of this aspect, the system can further implement a mechanism with technologies including homotopy-morphing operations, key-cloaking processes, and complete key transmission sub-unit for both a legacy communication link and a quantum communication link to build a solution with highest-strength security. In some embodiments, this invention is implemented as a mechanism with technology in the combination of homotopy-morphing operations and security key-exchanging scheme for legacy channels (legacy key-exchanging sub-unit of the present invention) where the system can perform enhanced quantum key-exchanging processes via legacy communication links to evade malicious detection wherein such malicious detection usually concentrates on transmission through quantum channels.

In some embodiments, this technology implements a mechanism (such as a Banach-space computing module) with specified space-switching operations through a Banach space to avoid key retrieving or decryption processes being compromised by quantum computing in a Hilbert space. In some special embodiments, the technologies for the legacy key-exchanging sub-unit and the quantum key-exchanging sub-unit of this invention are also applicable to be implemented for legacy communication links separately as a security scheme, to provide some enhancement on key-exchanging processes for conventional symmetric and asymmetric cryptography key systems. In some embodiments, a solution implements the technology combination of the homotopy-morphing operations and the legacy key-exchanging sub-unit to extend the life cycle for the legacy key-exchanging systems and save a lot of capital expenditure in the short term on the device replacement issue.

Figure 1:
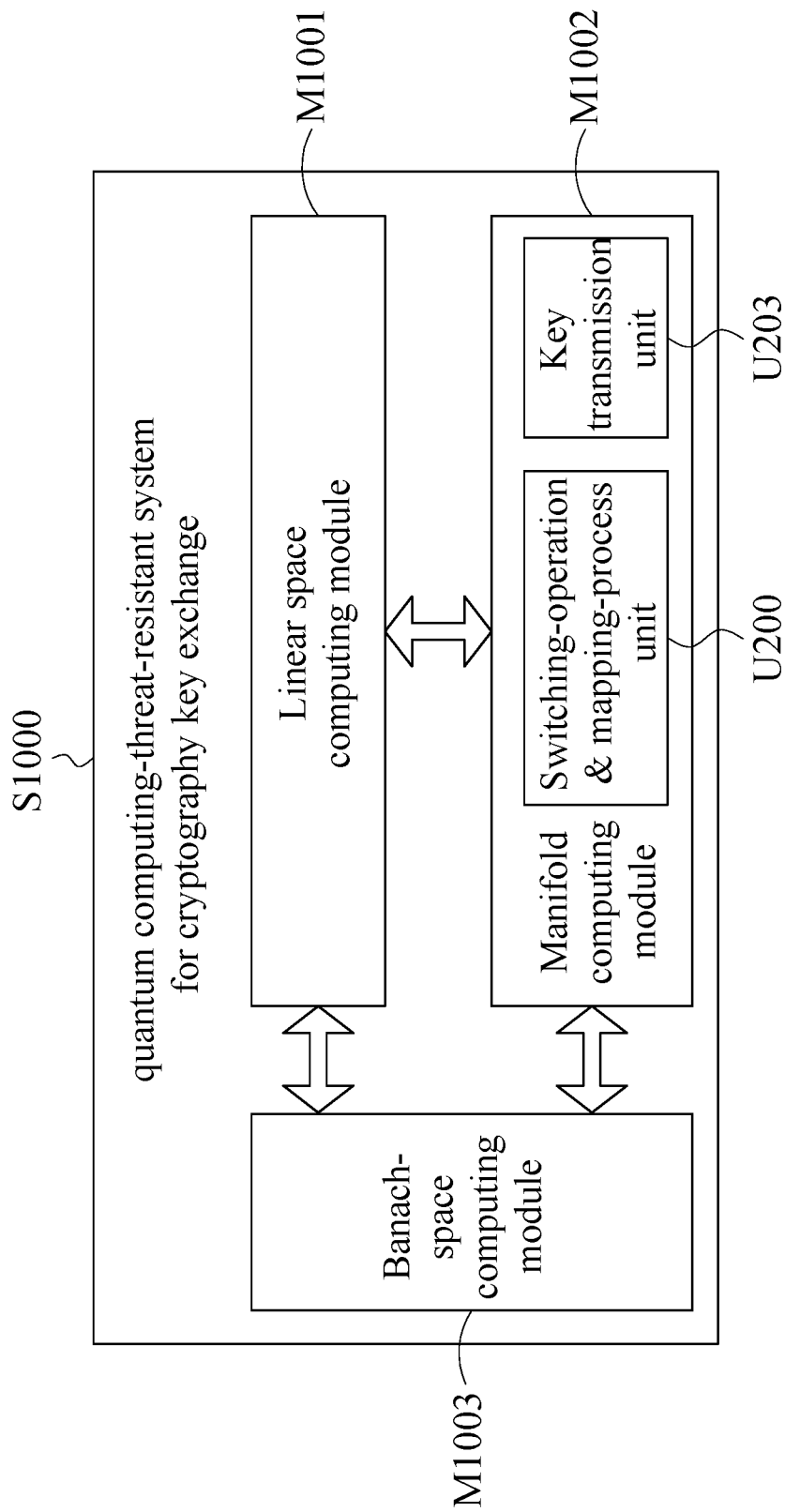
FIG. 1 is a structural block diagram of a quantum computing-threat-resistant system for cryptography key exchange according to an embodiment of the present invention.

Refer to FIG. 1, which is a structural block diagram of a quantum computing-threat-resistant system according to an embodiment of the present invention. In an embodiment, the quantum computing-threat-resistant system for cryptography key exchange S1000 includes a linear-space computing module M1001, a manifold computing module M1002, and a Banach-space computing module M1003. The linear-space computing module M1001 efficiently provides the basic operations required by various conversions in a linear space, and helps to ensure the correctness of various basic conversion operations; and the manifold computing module M1002 adopts means of homotopy-morphing operations or key-cloaking computing through the switching-operation & mapping-process unit U200, thereby to perform manifold topology operations on data corresponding to key information, so as to derive a switched key data for use on key-exchanging processes. Furthermore, the key transmission unit U203 of the manifold computing module M1002 maps the switched key data derived from U200 on a transmitter side to a data type in a form for security transmission, or receives and decrypts the data in a form for security transmission on a receiver side, so as to facilitate and enhance cryptography key-exchanging processes. In order to facilitate and enhance quality of quantum communication as well, referring to FIG. 2, wherein the key transmission unit U203 further comprises: a quantum steering sub-unit U20303 which is for a quantum channel to perform quantum communication with quantum steering mechanism; and a Bell-measurement sub-unit U20304 for confirming whether there is a decoherence issue with current quantum communication in a quantum channel. Besides, in some embodiments, the switched key data derived from U200 can be treated as a proprietary encoded data formed with a manifold in a topology space; thereby the Banach-space computing module M1003 is coupled to the linear-space computing module M1001 and the manifold computing module M1002, for supporting the manifold computing module M1002 to switch the proprietary encoded data from a form of topology space to a form of a Banach space on a transmitter side, so as to facilitate the quantum computing-threat-resistant operations for key-exchanging processes; and then switching the proprietary encoded data into a form of a Hilbert space through a switching process based on a basis of a Banach space, so as to retrieve the original cryptography key information on a receiver side.

Figure 2:
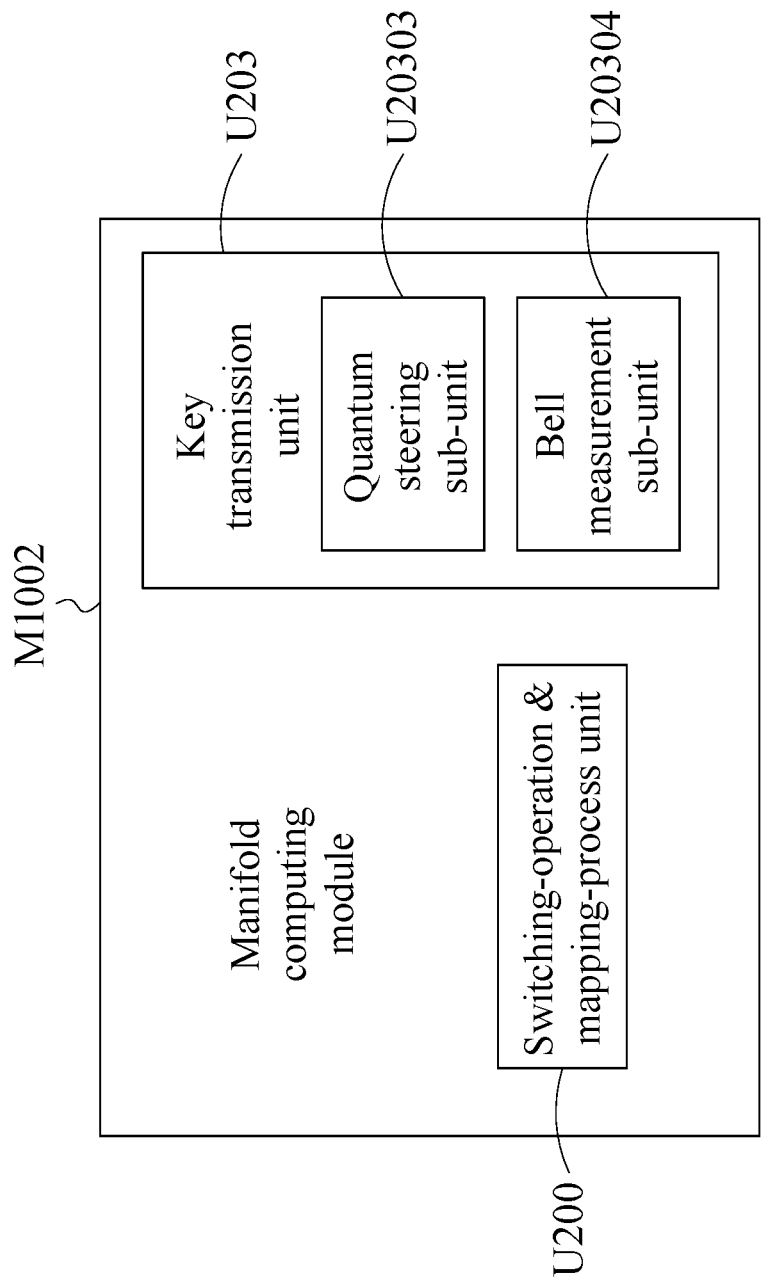
FIG. 2 is a block diagram of the manifold computing module according to an embodiment of the present invention.

Still referring to FIG. 2, in an embodiment, an implementation of the above-mentioned quantum steering sub-unit U20303 is a communication module with optical accessories (such as single-photon conducting module, beam splitter, beam divider, neutral density filter, etc.), electronic accessories and a micro-control unit driven by firmware for performing quantum steering mechanism within a quantum channel, wherein the sub-unit U20303 can facilitate the quantum communication with secure quantum teleportation. Besides, an implementation of the above-mentioned Bell-measurement sub-unit U20304 is a communication module with optical accessories (such as linear optics, photon detectors, beam splitter, etc.), electronic accessories and a micro-control unit driven by firmware for performing Bell measurement process to confirm whether there is a decoherence issue with the quantum communication and triggering a resending process to ensure the quality of communication. The above implementations of the quantum steering sub-unit U20303 and the Bell-measurement sub-unit U20304 are for the sake of illustration only, but the implementation of the invention is not limited thereto. For example, the above two components can be implemented as part of a communication module as well, and the micro-control unit is possible to be replaced with an ASIC, IOT device, FPGA, etc. Combining both of U20303 and U20304 within a quantum channel will facilitate and enhance the security and quality for quantum communication.

Figure 3:
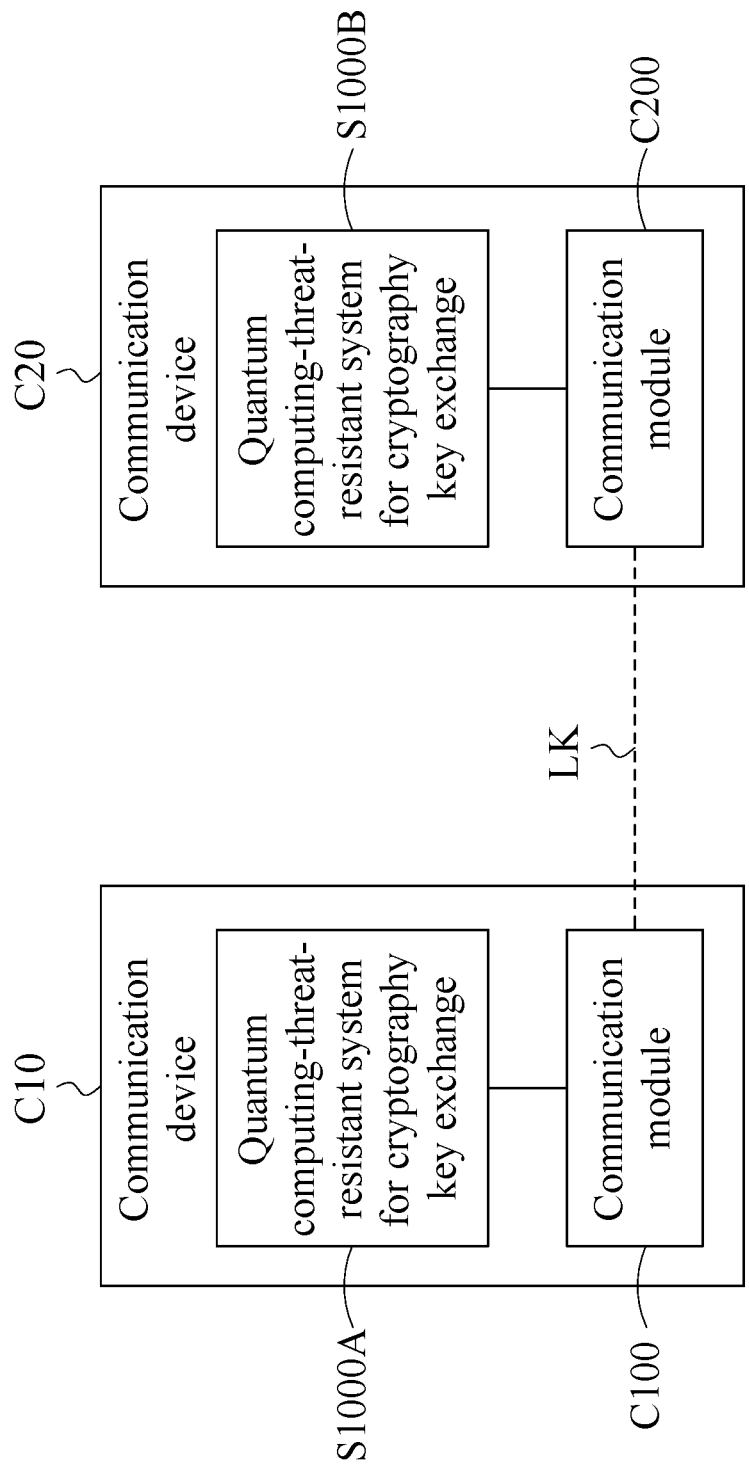
FIG. 3 is a schematic diagram of a user scenario according to an embodiment of FIG. 1.

Refer to FIG. 3, which is a schematic diagram of a user scenario according to an embodiment of FIG. 1. As shown in FIG. 3, the communication devices C10 and C20 communicate with each other through a communication link LK. The communication devices C10 and C20 are respectively installed with the quantum computing-threat-resistant system for cryptography key exchange S1000 as shown in FIG. 1, and connect to the corresponding communication module C100 and C200, wherein the communication module can send or receive the data of a cryptography key through the communication link LK. The communication devices C10 and C20 can perform various conventional key-exchanging processes. Wherein, the communication link LK can be a legacy communication channel (such as wired or wireless network communication, hereinafter "legacy channel"), or can be implemented as a quantum communication channel (such as an optical quantum channel, hereinafter "quantum channel"). Since the communication devices C10 and C20 respectively install the system S1000 as illustrated in FIG. 1, and use S1000 to facilitate and enhance the key-exchanging processes, a facilitated and enhanced effect to key exchange with quantum computing-threat-resistance is provided.

Communication devices (such as C10 or C20) can be implemented based on computing devices (such as computers, servers, or other computing devices); and communication modules (such as C100 or C200) can be a combination of software, hardware or software and hardware (such as wired or wireless network card or communication circuit, or the corresponding communication protocol program in the relevant communication channel) used in communication devices (such as C10 or C20) for data communication. For example, when a key-exchanging process needs to be performed between communication devices (such as C10, C20), the manifold computing module M1002 of the system S1000 can be used in the devices C10, C20. For instance, performing key switching processes through the switching-operation & mapping-process unit U200 of the manifold computing module M1002, and then process the switched key data with the key transmission unit U203. In an embodiment, the key transmission unit U203 can be further coupled to the Banach-computing module M1003 and the communication modules (such as C100 or C200) of the communication device (such as C10, C20), so that M1003 switches the switched key data derived from U200 into a data type formed in a Banach space, and then handovers to the key transmission unit U203 for mapping the data to a data type in a form for security transmission through the communication link LK to the receiver side, to facilitate the key-exchanging processes.

Therefore, the key transmission unit U203 can process the switched key data and make it applicable to be delivered between the transmitter side and the receiver side through the corresponding communication link LK. When using a communication device (such as C10 or C20) for the key-exchanging process, the quantum computing-threat-resistant system for cryptography key exchange S1000 of the communication device can be configured to be coupled to the communication module of the communication device (such as C100 or C200), so the system S1000 is for facilitating the key-exchanging process between communication modules, thus it is not limited to generic key-exchanging processes implemented between communication devices. For example, the system S1000 can be implemented as a software library, a program interface, or a hardware module, and is used or called by a dedicated program, program module, or hardware module that implements the key-exchanging process in the communication device; for another example, based on the system S1000, it can be implemented as an executable program or a hardware module for a key-exchanging process or be used as part of key-exchanging processes. However, the implementation of the present invention is not limited to the above instances. The key-exchanging processes may be various conventional or based on conventional key-exchanging processes, or can be other applicable key-exchanging processes or communication protocols.

Figure 4A:
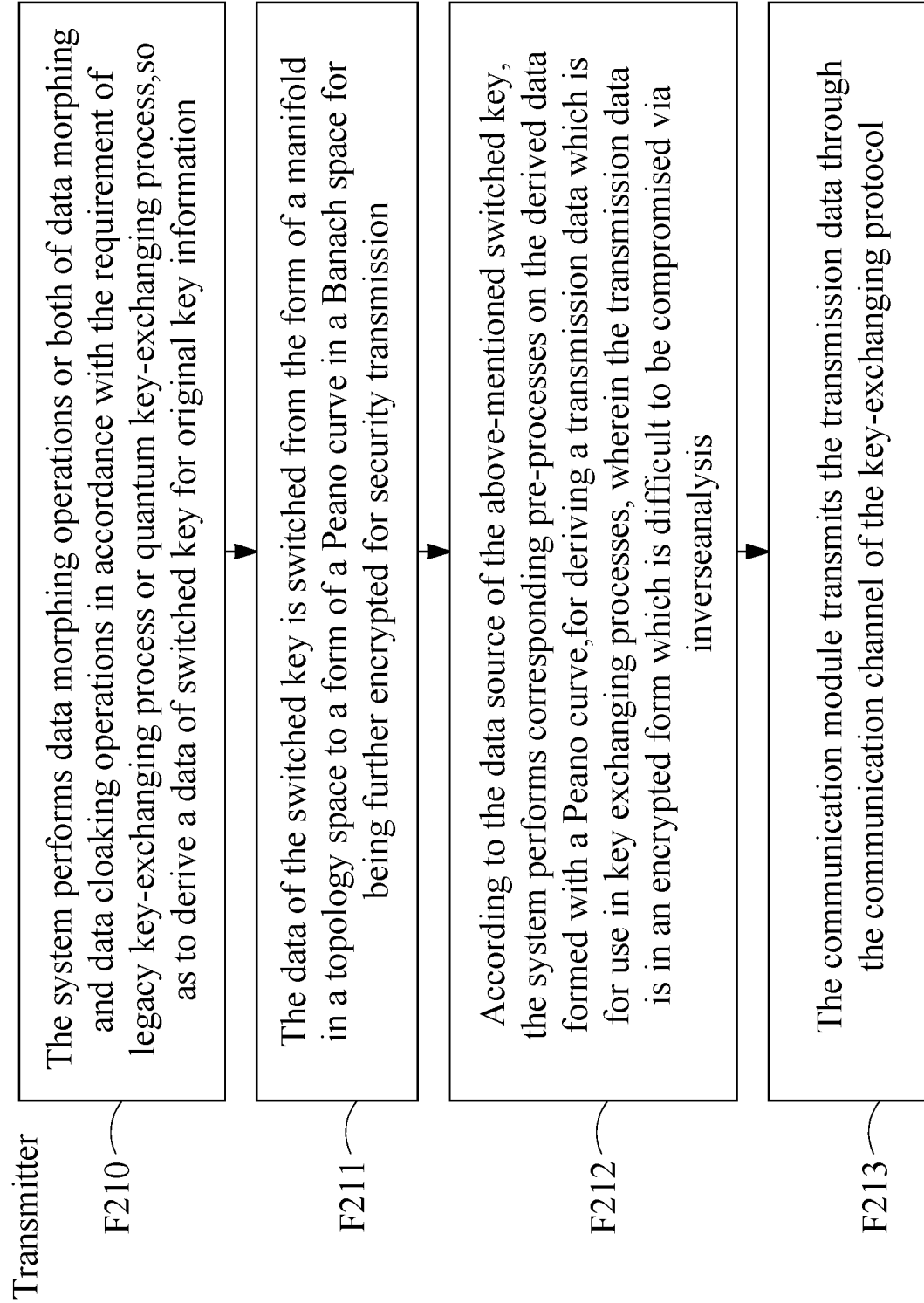
FIG. 4A is a dataflow diagram showing main data flow related to FIG. 3.
Figure 4B:
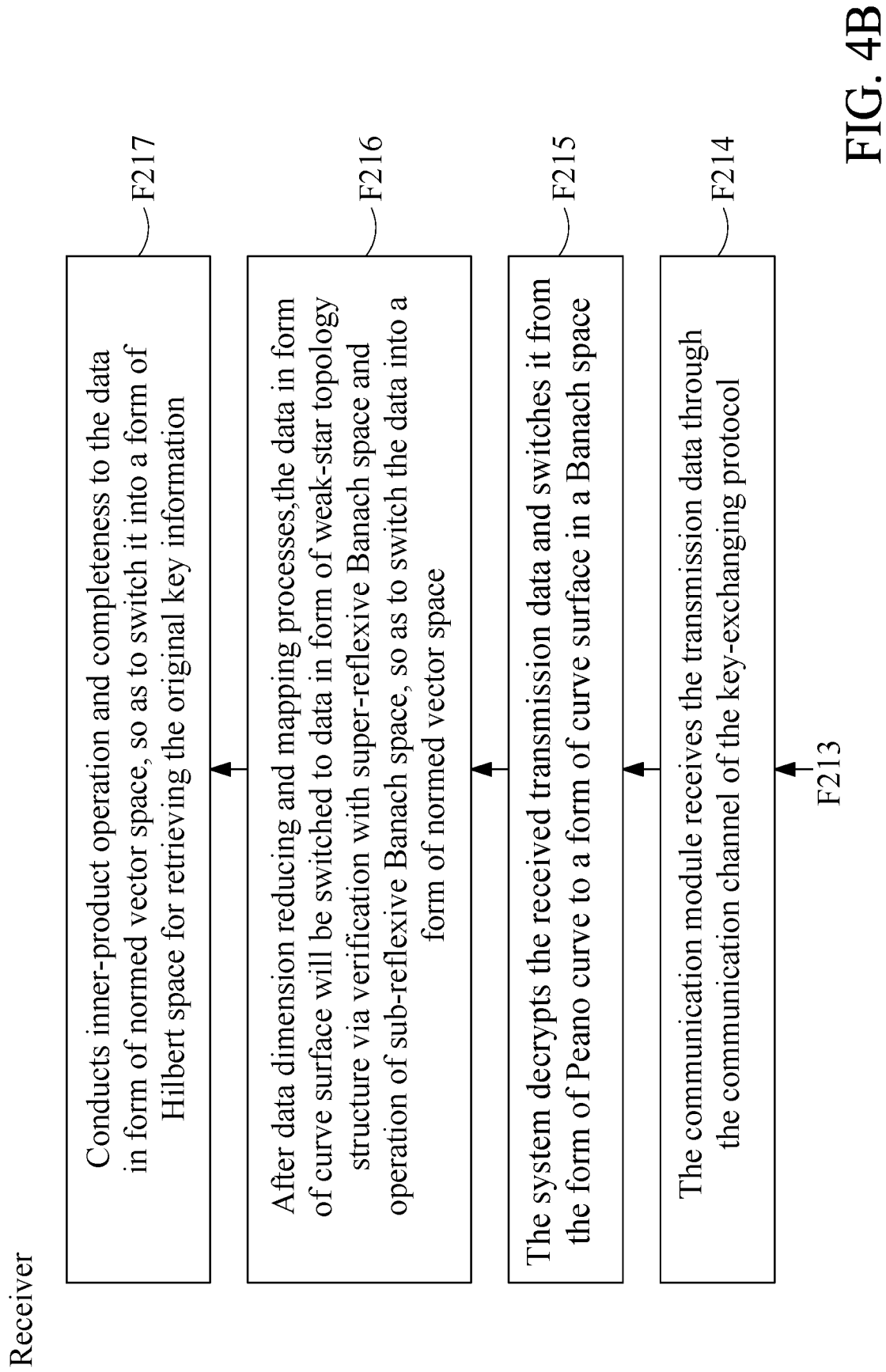
FIG. 4B is a dataflow diagram continuation of FIG. 4A showing main data flow related to FIG. 3.

Refer to FIG. 4A and FIG. 4B, which are dataflow diagrams illustrating the user scenario of FIG. 3. The following explains an applicable data flow of the present invention with FIG. 4A and FIG. 4B for clear understanding of a preferred user case. The steps of the dataflow include: 1) first, on the transmitter side C10, at block F210, the system drives a switching-operation & mapping-process unit U200 to perform data morphing operations or both of data morphing and data cloaking operations in accordance with the requirement of legacy key-exchanging process or quantum key-exchanging process, so as to derive a data of switched key for original key information; 2) second, as shown at block F211, the data of the switched key is switched by the Banach-space computing module M1003 from the form of a manifold in a topology space to a form of a Peano curve in a Banach space for being further encrypted for security transmission; 3) further, as shown at block F212, according to the data source of the above-mentioned switched key data, the system drives the key transmission unit U203 to perform corresponding pre-processes on the derived data formed with a Peano curve, for deriving a transmission data which is for use in key-exchanging processes, wherein the transmission data is in an encrypted form which is difficult to be compromised via inverse analysis; 4) then, at block F213, the communication module C100 transmits the transmission data through the communication channel LK corresponding to the key-exchanging protocol; 5) thereafter, on the receiver side, as shown at block F214, the communication module C200 receives the transmission data through the communication channel LK of the key-exchanging protocol; 6) then, as shown at block F215, the system drives the key transmission unit U203 to decrypt the received transmission data and couple to the Banach-space computing module M1003 for switching it from the form of a Peano curve to a form of curve surface in a Banach space; 7) as shown at block F216, the Banach-space computing module M1003 performs data dimension reducing and mapping processes, thereby the data in a form of curve surface will be switched to data in a form of weak-star topology structure via verification with a super-reflexive Banach space and operation of a sub-reflexive Banach space, so as to switch the data into a form of normed vector space; 8) Finally, M1003 conducts inner-product operation and completeness to the data in a form of normed vector space, so as to switch it into a form of a Hilbert space for retrieving the original key information. Wherein, the block F210~block F213 are performed on a transmitter side C10, and the block F214~block F217 are performed on a transmitter side C20.

Figure 5:
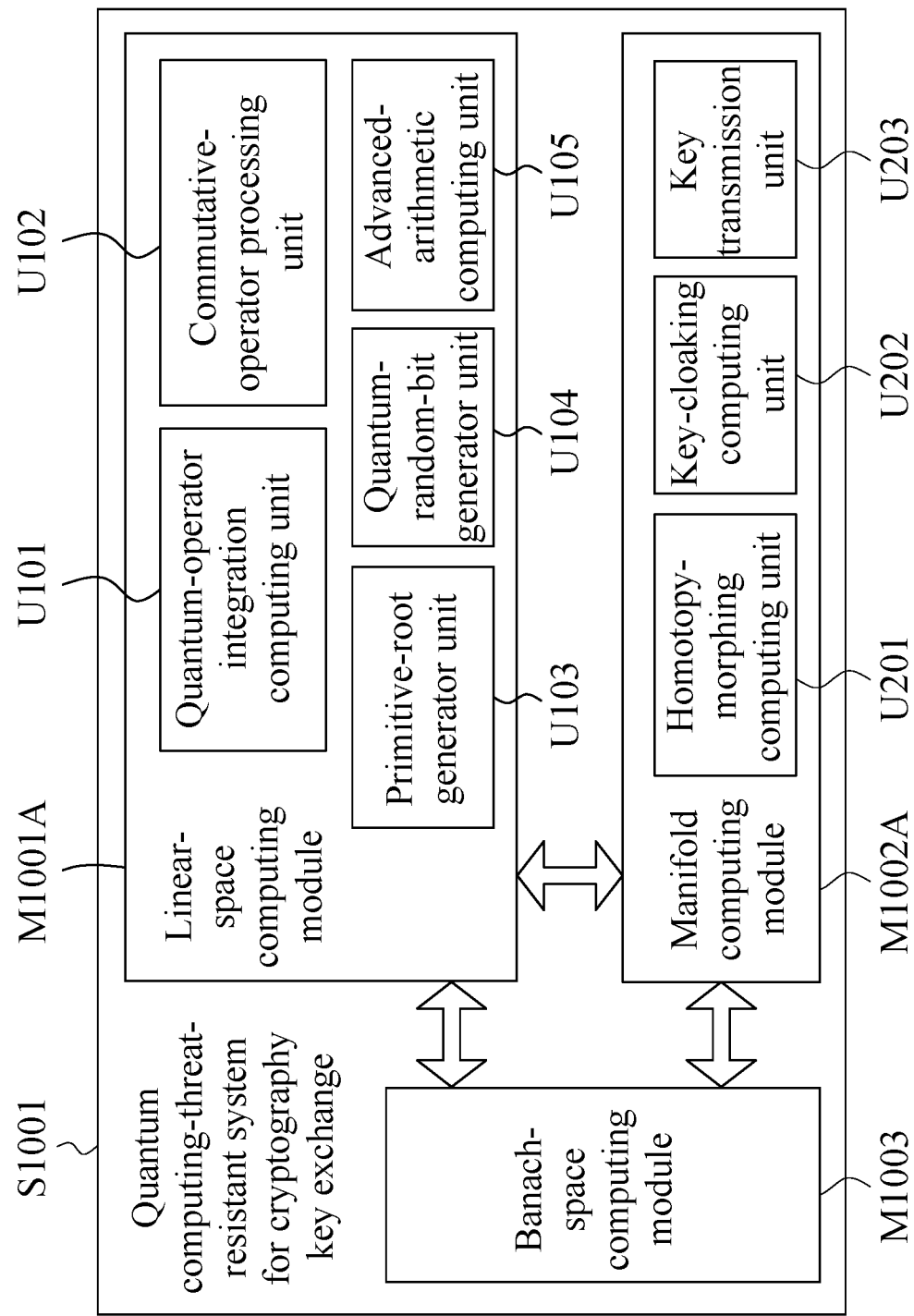
FIG. 5 is a structural block diagram of a quantum computing-threat-resistant system for cryptography key exchange according to an embodiment of the present invention.

For explanation of the present invention in detail, as shown in FIG. 5, a quantum computing-threat-resistant system for cryptography key exchange S1001 is provided, wherein the manifold computing module M1002A is for implementing a key switching mechanism which includes the technologies of homotopy-morphing operations and key-cloaking processes. Secondly, other embodiments of the system S1001 are provided as well.

A system S1001, as shown in FIG. 5, comprises: a linear-space computing module M1001A, a manifold computing module M1002A, and a Banach-space computing module M1003. Wherein, the linear-space computing module M1001A comprises the following units: 1) a quantum-operator-integration computing unit U101, for supporting basic quantum operations in a linear space; 2) a commutative-operator processing unit U102, for maintaining the completeness of the original quantum information; 3) a primitive-root generator unit U103, for leveraging resolved primitive root to derive applicative cyclic group in the linear space; 4) a quantum-random-bit generator unit U104, which provides true randomness for the primitive root generator unit to select one from applicable primitive roots; and 5) an advanced-arithmetic computing unit U105, which provides computing capability of modulo powers for data formed with algebraic structures.

In an embodiment, the above-mentioned quantum-operator-integration computing unit U101 performs the following operations for supporting basic quantum operations in a linear space: 1) performing unitary transformation for linear matrices; 2) performing dimension-reduction process on a unitary matrix in hyperspace; 3) performing a verification of orthonormality for the bases of a vector space; 4) performing inner product operations for a vector space; 5) performing eigenization process for a vector space so as to derive corresponding eigen value and eigen vector; 6) checking whether a quantum operator for use is a Hermitian operator; 7) finding the quantum transition probability for a ground state via analysis on collision cross section; 8) leveraging Laplace transform to derive wave vectors which are perpendicular with each other in a vector space; and 9) making use of applicable conversion operators to switch a vector space to a conjugated complex space.

Figure 6:
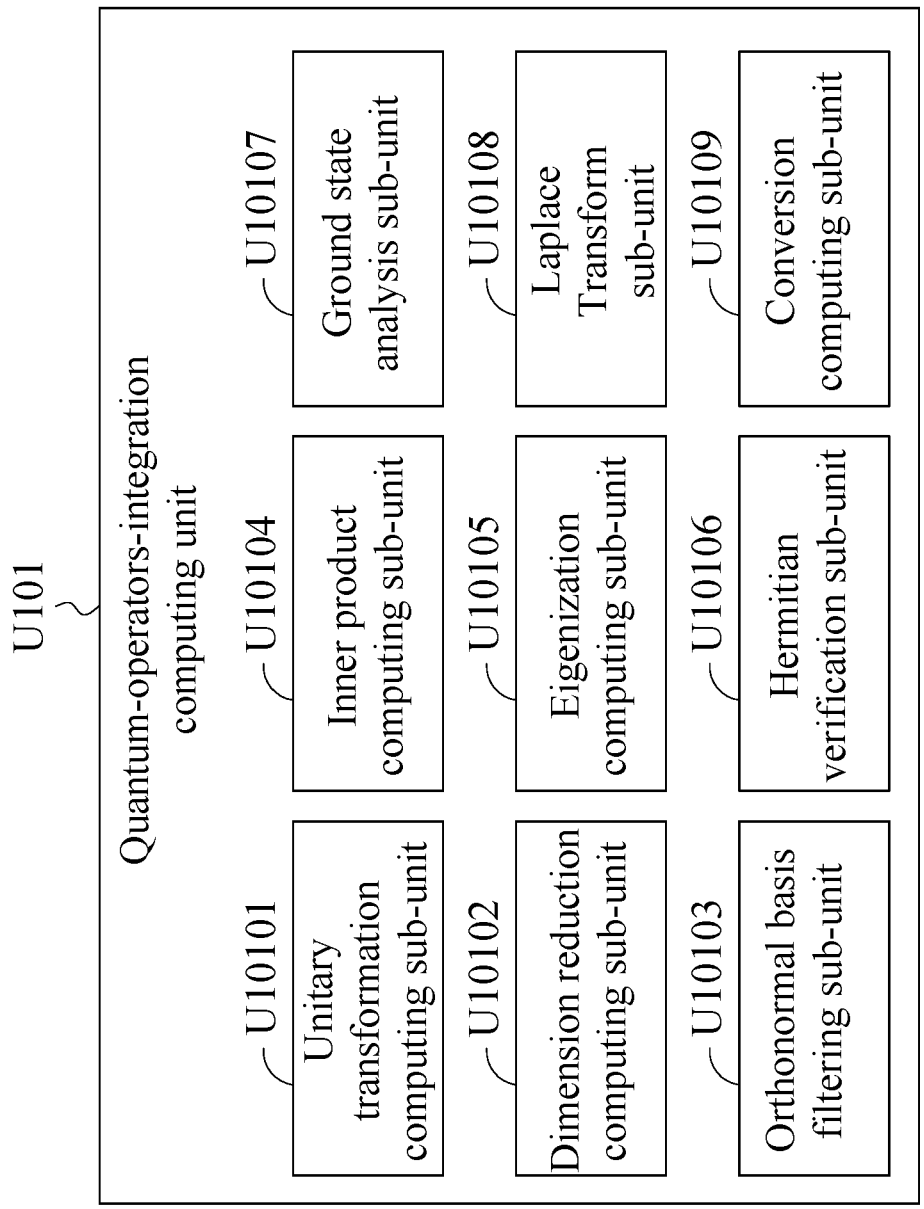
FIG. 6 is a block diagram of the quantum-operator-integration computing unit according to an embodiment of the present invention.

In order to implement the above operations, as shown in FIG. 6, the quantum-operator-integration computing unit U101 can implement the following sub-units as instruction sets for performing the related operations: 1) a unitary transformation computing sub-unit U10101 which performs unitary transformation for linear matrices; 2) a dimension reduction computing sub-unit U10102 which performs a dimension reduction process for a unitary matrix in a hyperspace; 3) an orthonormal basis filtering sub-unit U10103 which performs a verification of orthonormality for the bases of a vector space, so as to discard non-orthonormal bases in a vector space; 4) an inner product computing sub-unit U10104 which conducts inner product operations for a vector space; 5) an eigenization computing sub-unit U10105 which performs eigenization process to derive eigen value and eigen vector for a vector space; 6) a Hermitian verification sub-unit U10106 which checks whether a quantum operator for use is a Hermitian operator (for example: checking whether there is a relation of $$\langle\psi|\hat{O}|\psi\rangle = \langle\psi|\hat{O}|\psi\rangle^*$$

between the operator $\hat{O}$ for use and the quantum state $\psi$ for the operation); 7) a ground state analysis sub-unit U10107 to find the quantum transition probability for a ground state via leveraging calculation on the collision cross section (for example: performing simulations with a model of Feynman diagram), so as to determine whether the received quantum states are reasonable; 8) a Laplace Transform sub-unit U10108 to derive wave vectors which are perpendicular with each other in a vector space, so as to resolve the orthonormal bases for the vector space; and 9) a conversion computing sub-unit U10109 for making use of applicable conversion operators to switch a quantum state from a vector space to quantum state in a conjugated complex space, so as to analyze the degeneration status of quantum key states. Therefore, based on the understanding of the above quantum-operator-integration computing unit related technical ideas, the following applications can be further facilitated: 1) the implementation of the Laplace Transform sub-unit can help on the requirement of resolving the orthonormal bases in a vector space for generic quantum computing; 2) the implementation of the conversion computing sub-unit can help on analyzing the level of degeneration status for a set of generic quantum states via the conversion operation between vector space and conjugate complex number space; 3) the implementation of the ground state analysis sub-unit can help on determining whether the received quantum states are reasonable in a generic quantum communication environment via calculation of transition probability from ground state.

In an embodiment, as shown in FIG. 5, in order to maintain the completeness of the original quantum cryptography key information, the result of related switching processes with the operators mentioned in the above quantum-operator-integration computing unit U101 will be handovered to the commutative-operator processing unit U102 for further confirmation. The operations performed by U102 comprise: 1) performing non-orthogonal conversion on the observed quantum states to derive eigen states projected on an orthogonal coordinate system first; 2) validating whether a Hermitian transform is applicable for the derived eigen states; 3) performing phase correction on the derived eigen states if any degenerated state is found after Hermitian transform; 4) making use of C.S.C.O. (complete set of commuting observables) to recover the state if there is still degenerated state after performing phase correction; that means performing matrix operation on the observed quantum states with C.S.C.O. to recover the completeness, for example, leveraging the commutation relation constructed by position operator (or coordinate operator), momentum operator, angular momentum operator, Kronecker delta function $$\left(\left[\delta_{ij} = \begin{cases} 1 & (i = j) \\ 0 & (i \neq j) \end{cases}\right]\right),$$

and Levi-Civita symbol $$\left(\boxed{\mathcal{E}i_1 i_2 \ldots i_n}\right)$$

(the applicable relations such as:

$$\boxed{[\hat{x}_i, \hat{x}_j] = 0} \boxed{[\hat{p}_i, \hat{p}_j] = 0} \boxed{[\hat{x}_i, \hat{p}_j] = i\hbar\delta_{ij}} \boxed{[\hat{L}_i, \hat{L}_j] = i\hbar\epsilon_{ijk}\hat{L}_k}),$$

and also coupling to Poisson bracket and Dirac's equation:

$$\boxed{[\hat{f}, \hat{g}] = i\hbar\widehat{\{f,g\}}},$$

wherein f, g are corresponding to classic observations, and the corresponding quantum terms are $\hat{f}$, $\hat{g}$, so as to recover the quantum state via the corresponding classic observation.

Thereafter, the complete conversion result derived from the above operations will couple to the above-mentioned quantum-random-bit generator unit U104 and the primitive-root generator unit U103, so as to further leverage primitive roots through a facilitated process to derive an applicable algebraic-structured cyclic group with true randomness, wherein the true randomness is provided by U104 and the facilitated process is performed by U103. An example for the process: 1) generating a group of G with true random bits; 2) then getting the group order |G|, by means of Euler's Phi function; 3) thereby to derive the element order ord(a), by means of Lagrange theorem, wherein a is an element of group G; 4) leveraging Euler's theorem (also known as Fermat-Euler theorem) coupled to the element order to derive the primitive root g; and then 5) deriving the cyclic group through computing with modulo power of the primitive root. Further, based on some conventional technology known by PHOSITA, the elements of the derived cyclic group are applicable for a re-encoding process on a cryptography key. For instance, making use of polynomial as the element of GF($2^3$) for bitwise encoding, such as 000→0, 001→1, 010→x, 011→x+1, 100→$x^2$, 101→$x^2$+1, 110→$x^2$+x, 111→$x^2$+x+1, wherein the solution of x is the primitive root g.

Therefore, based on the combination of the above-mentioned quantum-operator-integration computing unit U101 and the commutative-operator processing unit U102 related technical ideas, the following applications can be further facilitated: 1) the implementation of the analysis on the received quantum states for determining the quality of a quantum communication; 2) the implementation of analysis by means of Hermitian operation for determining the reasonability of the observed physical quantity; 3) the implementation of the analysis on a received data to determine whether there is basis of a Hilbert space within it, so as to determine whether the analyzed data is related to some combination of quantum states.

Figure 7:
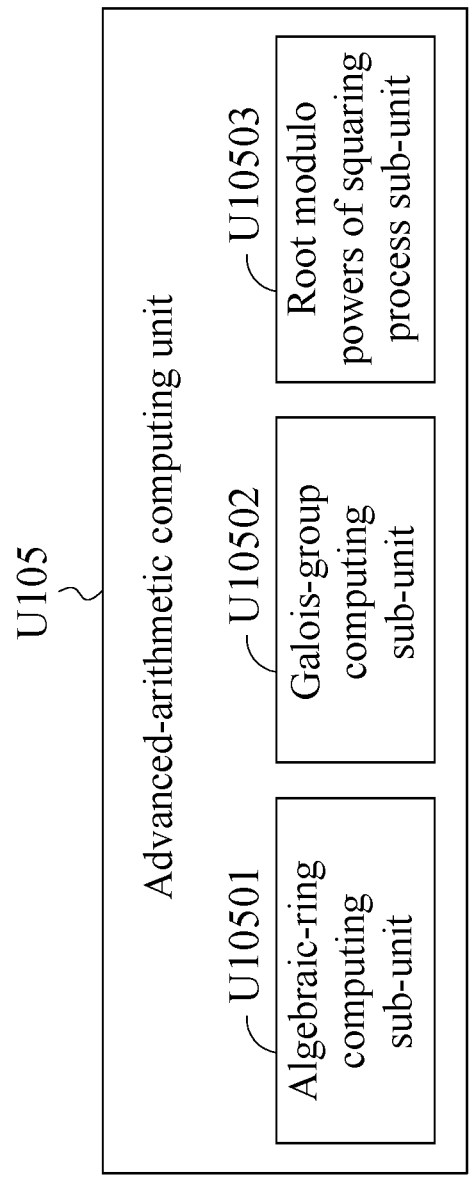
FIG. 7 is a block diagram of an advanced-arithmetic computing unit according to an embodiment of the present invention.

As shown in FIG. 7 and also referring to FIG. 5, in this preferred embodiment, the above-mentioned advanced-arithmetic computing unit U105 of the linear-space computing module M1001A at least comprises the following three sub-units: 1) an algebraic-ring computing sub-unit U10501 which provides dual operators to support maintenance and computing processes for data on an algebraic ring (for example: supporting both of $\oplus$ and $\otimes$ operators for operations on an algebraic ring); 2) a Galois-group computing sub-unit U10502 which provides modular arithmetic of polynomial for deriving applicable Galois group and performing computing processes for it (for example: providing $g^3$+g+1 as a modular arithmetic of polynomial to support commutative-group computing on GF($2^3$)); and 3) a root modulo powers of squaring process sub-unit U10503 which makes use of Euler's theorem and Fermat's little theorem to support squaring processes for root modulo powers, so as to solve the computing issue of complicated modulo power for deriving primitive roots (such as: by means of Euler's theorem to check whether $a^{\varphi(n)} \equiv 1$ (mod n) for each element a in a group).

Combining the above sub-units in an implementation of software, hardware, or a combination of software and hardware as an advanced-arithmetic computing unit U105 can provide secure algebraic operations with high complexity, and facilitate the computing processes for root modulo powers in efficiency. In addition, based on the combination of the advanced-arithmetic computing unit related technical ideas, the following applications can be further facilitated: 1) the implementation of the instruction set or software library with the dual operators such as $\oplus$ and $\otimes$ operators for an algebraic ring which helps on the simulation of quantum gates in parallel and series as well; 2) coupling to the implementation of library for algebraic-ring operations, the implementation of instruction set or software library for commutative group to support modulo polynomial computing and bi-operators at the same time, which helps on the applications of linear combination of quantum gates as well; 3) the implementation of the instruction set or software library with for modulo power computing with Euler's theorem and Fermat's little theorem which helps on facilitating the matrix operation of modulo power computing for integration of quantum gates; 4) the implementation based on the effect of modular polynomial computing provided by this unit, coupled to other units of the manifold computing module in the present invention, which helps on implementation of quantum one-way trapdoor function as well; and 5) furthermore, combining the above implementations with the advanced-arithmetic computing unit related technical ideas not only helps on developing system of quantum linear equations for design of symmetric quantum cryptography key solution, but also facilitating development of quantum hash functions applied for various quantum keys.

Figure 8:
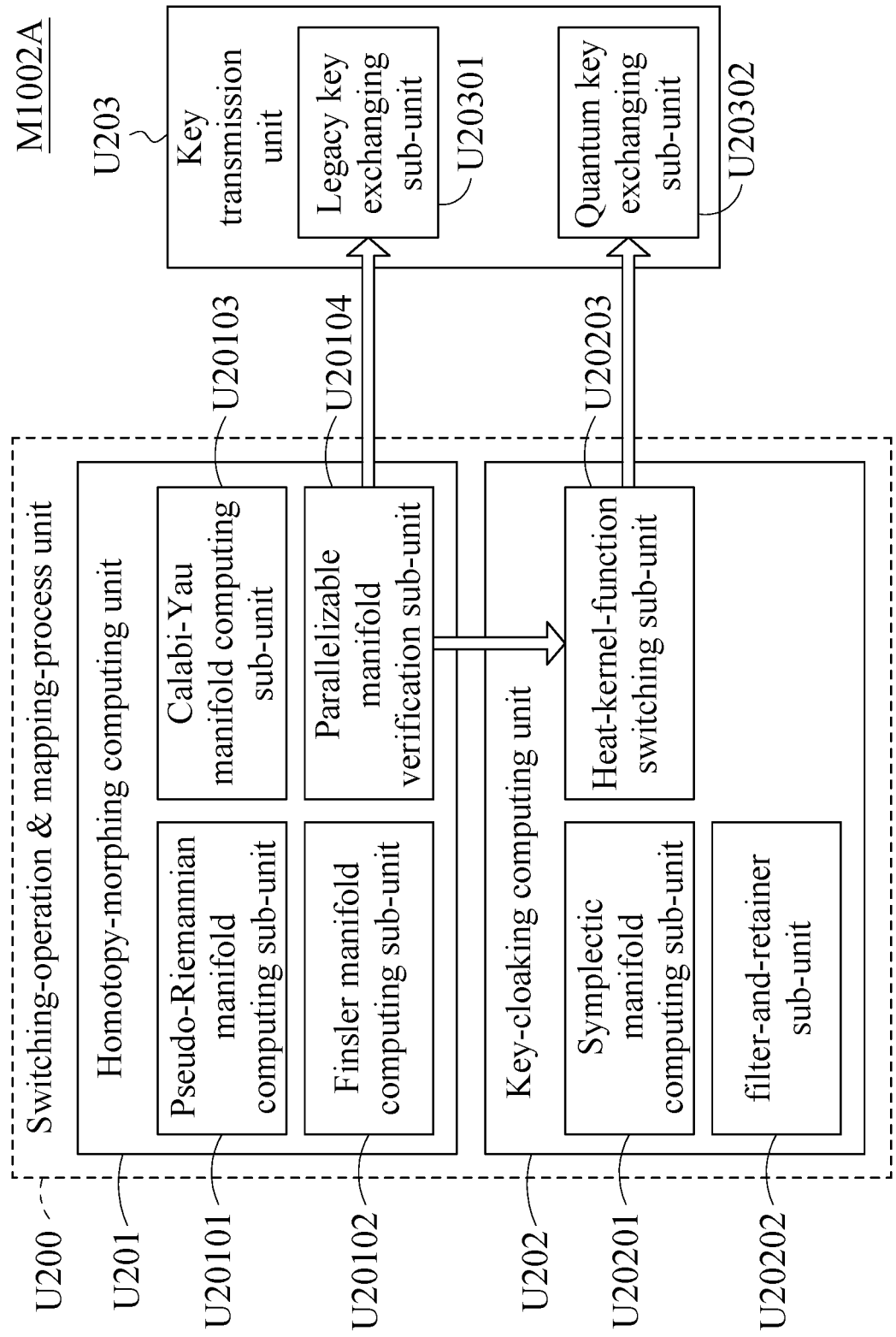
FIG. 8 is a structural block diagram of a manifold computing module according to an embodiment of the present invention.

Thereafter, as shown in FIG. 8 and also referring to FIG. 5, in an embodiment, the above-mentioned manifold computing module M1002A of the system comprises: a homotopy-morphing computing unit U201, a key-cloaking computing unit U202, and a key transmission unit U203. Therefore, in this embodiment, the switching-operation & mapping-process unit U200 of the system S1001 includes a homotopy-morphing computing unit U201 and a key-cloaking computing unit U202. When the cryptography key is a legacy key, the homotopy-morphing computing unit U201 will perform the homotopy-morphing operation on the key data to derive a homotopy-morphed legacy key data as a switched key data. When the cryptography key is a quantum key, the key-cloaking computing unit U202 will perform the key-cloaking operation on the key data to derive a cloaked quantum key data as a switched key data.

As shown in FIG. 8, in an embodiment, the above-mentioned homotopy-morphing computing unit U201 of the manifold computing module M1002A performs a set of operations related to mapping processes with algebraic data structures based on means of homotopy morphing, wherein the operations comprise: 1) leveraging metric tensor of a pseudo-Riemannian manifold to switch an encoded data of key information into a Lorentzian manifold model, so as to derive an encoded data in a form of a Lorentzian manifold; 2) leveraging operations of a differential manifold to promote the metrics of a Lorentzian manifold to a Finsler space, so as to switch the encoded data from a form of a Lorentzian manifold to a form of a Finsler manifold; 3) leveraging Calabi-Yau quantic polynomial to switch the encoded data from the form of a Finsler manifold in a complex three-dimension space to a form of a Calabi-Yau manifold; and 4) verifying whether the encoded data in the form of a Calabi-Yau manifold is applicable in a form of a parallelizable manifold as well, so as to confirm whether the final result of homotopy-morphing computing is applicable. In order to implement the above operations, referring to FIG. 8, the homotopy-morphing computing unit U201 can be implemented as instruction sets of the following sub-units: 1) a pseudo-Riemannian manifold computing sub-unit U20101 which switches an encoded data of key information into a Lorentzian manifold model via leveraging metric tensor of a pseudo-Riemannian manifold (for example: based on the pseudo-Riemannian metrics $R^{p,1}$ to switch the data to a form of $g=dx_1^2+ \ldots +dx_p^2-dx_{p+1}^2$); 2) a Finsler manifold computing sub-unit U20102 which leverages operations of a differential manifold to promote the metrics of a Lorentzian manifold to a Finsler space, so as to switch the encoded data from a form of a Lorentzian manifold to a form of a Finsler manifold; 3) a Calabi-Yau manifold computing sub-unit U20103 which makes use of Calabi-Yau quantic polynomial to switch the form of a Finsler manifold in a complex three-dimensional space to the form of a Calabi-Yau manifold; and 4) a parallelizable manifold verification sub-unit U20104 which verifies whether the encoded data in the form of a Calabi-Yau manifold is applicable in a form of a parallelizable manifold as well, so as to determine whether the final result of homotopy-morphing computing is applicable.

Thereby, based on the above description, it is clear that the technology of the homotopy-morphing computing unit does not focus on the idea of a key generator. Combining the above sub-units in an implementation of software, hardware, or a combination of software and hardware as a homotopy-morphing computing unit mainly provides the effect of homotopy morphing, to switch the data of a key information (such as encoding of a legacy key, or spin and permutation of quantum key states) to a data function formed in a topology space, via manifold computing technology with dimension promotion and bases replacement. It is equivalent to support an enhanced cryptography function on a transmitter side, and such switching processes of homotopy morphing will make quantum computing operations fail to analyze a cryptography key in a Hilbert space during the key-exchanging processes. Therefore, according to the related technical ideas of the homotopy-morphing computing unit referred to the present invention: 1) leveraging the Lorentz manifold to switch the key data in the first stage provides effects of dimension promotion on key information and complete mapping on original key data, meanwhile the reversibility of the related data-type switching is restricted by specific manifold conditions that facilitates applications of the trapdoor function in cryptography design; 2) since the technical idea of the related manifold data switching is based on the applications of basis replacement and homotopy-morphing operations, based on isomorphic attributes, after the key data is switched from a Banach space to a Hilbert space via Banach-space operation for retrieving the original key information, it can be verified for the completeness of information exchange; thus, this technology not only avoids using a degenerated quantum key, but also facilitates the design of a proprietary key-exchanging protocol. In addition, based on the combination of the homotopy-morphing computing unit related technical ideas, the following applications can be further facilitated: 1) security design based on implementing cryptography switching function by means of homotopy morphing which is different from security application based on time-complexity consideration; 2) implementation with combination of basis replacement in mathematics space and data-dimension switching, which helps on development of applications to resist quantum computing brute-forcing by means of processing data in non-Hilbert spaces; 3) implementation of data processing in a form of a Calabi-Yau manifold for avoiding functional analysis; 4) implementation based on the homotopy-morphing computing unit coupling to key-cloaking technology in the present invention (data in a form of a Calabi-Yau manifold can be switched into a form of a Symplectic manifold via conducting means of a Hyperkahler manifold operation); 5) implementation of quantum cryptography bit-rotating cross different mathematics spaces via making use of partial space of a Calabi-Yau manifold where relates to space of superstring model, holonomy of a Calabi-Yau manifold, and basis vector of a Calabi-Yau manifold.

Still referring to FIG. 8 and FIG. 5, in an embodiment, the above-mentioned key-cloaking computing unit U202 of the manifold computing module M1002A performs a set of operations related to data mapping processes and block cipher operations via making use of mathematics spaces and time factors, wherein the operations comprise: 1) performing Symplectic manifold modeling with phase spaces on the encoded data of quantum key states, so as to derive a linear Symplectic space model for expressing the encoded data which is corresponding to the combination of quantum key states; 2) performing verifications on the combination of the quantum key states to discard decoherent quantum states meanwhile to avoid using a quantum state which occurs with low probability; 3) retaining significant information which is on a non-manifold edge, after conformal mapping operations on the encoded data which is corresponding to the combination of quantum key states; and 4) leveraging Dirac δ-function coupled to a Laplace operator, so as to switch the encoded data from a form of linear Symplectic space model into a form of time-variant Jacobi θ function, for achieving the effect of cloaking the quantum key. In order to implement the above operations, referring to FIG. 8, the key-cloaking computing unit U202 can be implemented as instruction sets of the following sub-units: 1) a Symplectic manifold computing sub-unit U20201 which performs Symplectic manifold modeling with phase spaces on the encoded data of quantum key states, so as to derive a linear Symplectic space model for expressing the encoded data which is corresponding to the combination of quantum key states; 2) a filter-and-retainer sub-unit U20202 which performs verifications on the combination of the quantum key states to discard decoherent quantum states meanwhile to avoid using a quantum state which occurs with low probability; and also retains significant information which is on a non-manifold edge, after conformal mapping operations on the encoded data which is corresponding to the combination of quantum key states (for example: based on the conformal mapping operation required for conventional manifold switching, there may be some element that cannot be mapped where such element is the edge information before mapping process, and that needs retaining); and 3) a heat kernel function switching sub-unit U20203 which leverages Dirac δ-function coupled to a Laplace operator, mapping the position eigen state to the coordinate of a complex plane wherein the eigen state is derived via position operator of multiple quantum states, so as to switch the encoded data from a form of linear Symplectic space model into a form of time-variant Jacobi θ function. Combining the above sub-units in an implementation of software, hardware, or a combination of software and hardware as a key-cloaking computing unit can achieve the effect of key cloaking to switch the data of quantum key states (such as spin and permutation) into a form of time-variant function. (for example, based on conventional means of functional analysis, to map the data of key states formed with Symplectic modeling to a form of heat kernel function) That makes a quantum computing attack failed to find applicable quantum key states for further operations during the key-exchanging processes. However, the heat kernel function adopted by the above embodiment is for example only, and the implementation based on the same technical idea is not limited thereto. For more examples, other conventional time-variant functions can be applicable as well (such as: time-variant wave function $$i\hbar \frac{\partial}{\partial t} \Psi(r, t) = \hat{H}\Psi(r, t),$$

or Rossler's chaos model $$\frac{dx(t)}{dt} = -y(t) - z(t)$$

$$\frac{dy(t)}{dt} = x(t) + a * y(t) \quad \frac{dz(t)}{dt} = b - c * z(t) + x(t) + z(t)).$$

Figure 9:
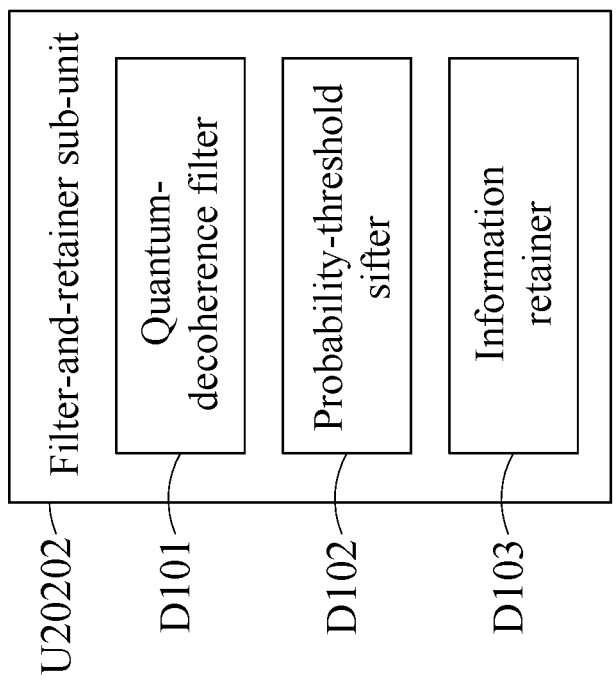
FIG. 9 is a block diagram of a filter-and-retainer sub-unit according to an embodiment of the present invention.

Referring to FIG. 9, in an embodiment, in order to implement the related operation performed by the above-mentioned filter-and-retainer sub-unit U20202 of the key-cloaking computing unit U202, the corresponding instruction set or software library further includes the following components: 1) a quantum-decoherence filter D101 which makes use of Hermitian transform to check whether there is decoherent quantum state within a combination of key states, and then filters out decoherent quantum key states, so as to ensure there is no decoherent states for use in key-exchanging processes; 2) a probability-threshold sifter D102 which sieves the quantum states whose probability of occurrence is higher than a configured threshold set via application of uncertainty principle coupled to corresponding wave function computing so as to adopt quantum states with longer entanglement duration (for example: by means of expressing the quantum states with linear combination of ground states, and then leveraging the square of the coefficients of the linear combination for evaluating the corresponding probability); and 3) an information retainer D103 for retaining significant information which is on a non-manifold edge, after conformal mapping operations on the encoded data which is corresponding to the combination of quantum key states. Combining the above components in an implementation of software, hardware, or a combination of software and hardware as a filter-and-retainer sub-unit can ensure the accuracy and success rate for the key-cloaking computing processes on the transmitter side and the receiver side during the key-exchanging processes. In addition, based on the combination of the filter-and-retainer sub-unit related technical ideas, the following applications can be further facilitated: 1) an implementation of abnormal-event alert, which monitors the decoherent status within a quantum communication system based on the idea of quantum-decoherence filter; 2) an implementation of analysis on the variation trend/degree of the system entropy, which monitors the decoherent status within a quantum communication system based on the idea of quantum-decoherence filter; 3) an implementation of analysis on the von-Neumann entropy of a system, which monitors the decoherent status within a quantum communication system based on the idea of quantum-decoherence filter and finds abnormal events about violating law of entropy increase (second law of thermodynamics); 4) an implementation of abnormal-event alert, which leverages the idea of probability-threshold sifter to find the events that the sum of occurrence probability is lasting more than 100% for a specific duration; 5) an implementation of abnormal-event alert, which leverages the idea of information retainer to find the events that there is too much information on non-manifold edges after conformal mapping operations where the events imply that there is abnormal quantum communication as well.

Comprehensively, according to the above description of the technical ideas related to key cloaking, in the present invention, it can be further understood: 1) it is possible to implement this technology based on software computing entirely without special hardware device for experiment; 2) the effect of its implementation is equivalent to provide an enhanced high-strength cryptography process for a key or information to be exchanged; 3) to the above-mentioned enhanced high-strength cryptography process, the means of key cloaking of the present invention is equivalent to introducing time factors to a cryptography process; 4) based on the above technical idea with time factors, the Symplectic manifold computing for key cloaking means is equivalent to performing high-strength block cipher process via modeling based on phase spaces; 5) meanwhile, coupling to a filter-and-retainer sub-unit, this implementation avoids encrypting to decoherent quantum states; and 6) furthermore, based on the technical understanding of the means through Dirac δ-function to a Jacobi θ heat kernel function, it is equivalent to providing an example that leverages the eigen value and eigen vector for a probability amplitude of quantum states, so as to make use of the derived eigen state to map the occurrence probability of positions to an orthogonal time-frequency coordinate system, for deriving the input parameters for a time-variant heat kernel function, and the application of such technical idea can facilitate applicable industrial designs on quantum one-time encryption.

Thereafter, referring to FIG. 8, in an embodiment, the above-mentioned key transmission unit U203 of the manifold computing module M1002A adopts corresponding enhancements on key-exchanging processes in accordance with the data source of the switched key, the enhancements comprise: 1) operations to enhance the legacy key-exchanging processes, for a switched key data derived from the homotopy-morphing computing unit U201 of the manifold computing module M1002A; wherein the operations switch the switched key data from a form of a manifold into a form of integral data derived with an integral equation of a curvature polynomial, parameterize the curvature polynomial expressed for the integral data, and then make use of a partial differential equation evoluted over time, so as to facilitate and enhance the key-exchanging processes via a legacy communication channel; 2) operations to enhance the quantum key-exchanging processes, for a switched key data derived from the key-cloaking computing unit U202 of the manifold computing module M1002A; wherein the operations switch the key data with a form of numeric pairs to a complex plane derived by an infinite iteration process, wherein the mentioned switched key data is cloaked in a heat kernel function and is corresponding to the combination of the quantum key states; based on the numeric pairs, to find the non-trivial zeros closed to the corresponding coordinates of the complex plane, and then make the set of all corresponding non-trivial zeros, the numeric pairs on the complex plane and the derived parameters of the complex plane, be coupled to a super-singular elliptic curve for performing encryption processes, so as to facilitate and enhance key-exchanging processes and key authentication.

As shown in FIG. 8, in an embodiment, in order to be applicable for use in legacy communication modules and quantum communication modules, so as to implement corresponding enhanced key-exchanging processes, the key transmission unit U203 includes the following sub-units: a legacy key-exchanging sub-unit U20301; and a quantum key-exchanging sub-unit U20302. Wherein, the legacy key-exchanging sub-unit U20301 is for processing the key data homotopy-morphed via the homotopy-morphing computing unit U201 so as to facilitate key-exchanging processes in a legacy channel; and the quantum key-exchanging sub-unit U20302 is for processing the key data cloaked via the key-cloaking computing unit U202 so as to facilitate key-exchanging processes in a quantum channel.

Figure 10A:
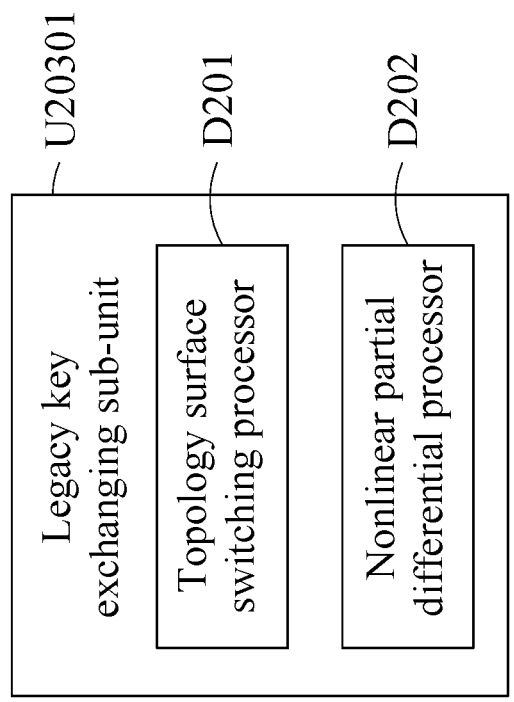
FIG. 10A is a block diagram of a legacy key exchanging sub-unit according to an embodiment of the present invention.
Figure 10B:
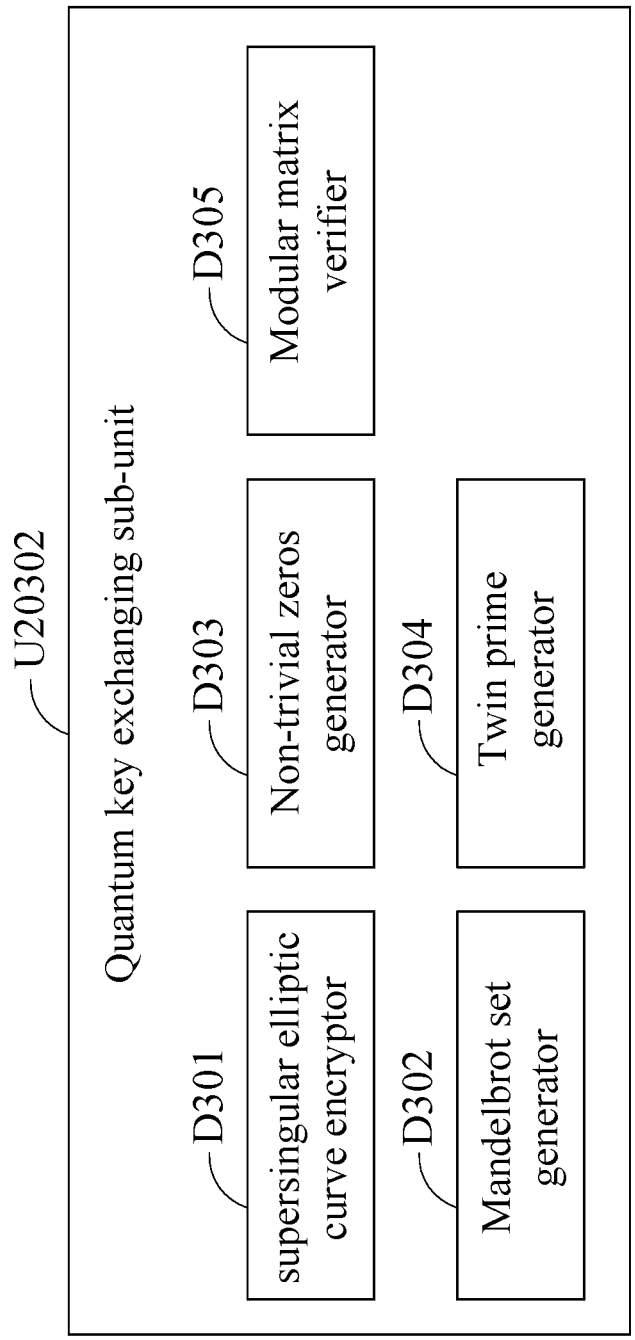
FIG. 10B is a block diagram of a quantum key exchanging sub-unit according to an embodiment of the present invention.

Referring to FIG. 10A and FIG. 10B, in an embodiment, in order to implement the above-mentioned corresponding enhancements performed by the key transmission unit U203 for key-exchanging processes in a legacy channel, the above-mentioned legacy key-exchanging sub-unit U20301 comprises the following components: 1) a topology surface switching processor D201 to process manifold data derived from the homotopy-morphing computing unit U201 formed with a Calabi-Yau quantic polynomial, wherein the data in a form of the Calabi-Yau manifold will be treated as a non-singular quintic hypersurface in $CP^4$, so as to make use of Atiyah-Singer index theorem, coupling to the Chern-Gauss-Bonnet theorem, to switch the manifold data from a form of a closed even-dimensional Riemannian manifold to a form derived with the integral equation of a curvature polynomial; and 2) a nonlinear partial differential processor D202 for delivering all the curvature parameters of the curvature polynomial via various nonlinear parabola partial differential equations evoluted over time; in this way, only the node which retains the specific target time parameters, will be able to resolve the correct curvature parameters by leveraging Tanh-function expansion method. Combining the above components in an implementation of software, hardware, or a combination of software and hardware into a legacy key-exchanging sub-unit can achieve the effect of facilitating and enhancing the key-exchanging processes, to switch the homotopy-morphed legacy key or the quantum key from a form of a manifold to a form derived with the integral equation of the curvature polynomial, furthermore, to parameterize the integral equation into the switched form with time-variant function, and then to make use of the switched form as a partial differential equation evoluted with time intervals, to facilitate and enhance the key-exchanging processes within a legacy channel.

In addition, according to the combination of the technical ideas related to legacy key-exchanging sub-unit in the present invention, it can be further understood: 1) the technical idea based on the parameterized curvature polynomial which can be delivered through nonlinear parabola partial differential equations coupling to Tanh-function expansion method, will facilitate applications to resist functional-analysis cracking, via leveraging polynomial switched from a manifold coupling to time factors; 2) the technical idea leveraging data formed with a Calabi-Yau manifold as input data to a topology-surface mapping function, will facilitate applications for data transmission between a Hilbert space and a Banach space; 3) once the technical idea of legacy key-exchanging sub-unit couples to the technical idea of Banach-space computing module in the present invention, it will facilitate the applications leveraging operations of dual vector spaces for confirming whether the data in transmission is tampered; 4) since the uniqueness to the combination of curvature parameters and time factors can be available, the implementation with such technical idea facilitates an application of high-security authentication as well; and 5) since the data stream implemented with the above technical ideas will be evoluted over time, thereby the authentication mechanism cannot be cracked by means of network packet duplication, thus the implementation with such technical idea facilitates an application of network-packet-broker resistance as well.

Still referring to FIGS. 10A and 10B, in some embodiments, in order to facilitate and enhance the key-exchanging processes in a quantum communication channel, the above-mentioned quantum key-exchanging sub-unit U20302 further implements the following components: a supersingular elliptic curve encryptor D301; a Mandelbrot set generator D302; and a non-trivial zero generator D303. Wherein, for the switched result of key-cloaking processes derived from U202, the quantum key-exchanging sub-unit U20302 will make use of the Mandelbrot set generator D302, to switch the numeric pairs formed from the quantum key information cloaked in a form of a heat kernel function, from coordinate system of a Euclidean space to a complex plane of a Mandelbrot set which is generated by an infinite-iteration process, so as to form a set of numeric pairs on that complex plane. Thereby, based on theorem 3 of Mandelbrot set (for $c \in M$, each $|Z_n| \leq 2$, $n=1, 2, \ldots$ ), D302 will perform a clustering process on the complex numeric pairs, so as to identify the edge of fractals on the complex plane and express it with a complex quadratic polynomial. Thereafter, in accordance with the complex quadratic polynomial, the non-trivial zeros generator D303 will find the non-trivial zeros which are closed to Riemann zeta function under Riemann hypothesis, wherein the complex quadratic polynomial is equivalent to the edge of fractals on the complex plane of the Mandelbrot set. Thereafter, U20302 implements the supersingular elliptic curve encryptor D301 to select a suitable super-singular elliptic curve, and use the super-singular primes which fit a Galois group as the generation points to generate encryption parameters for use in the simulation of the ElGamal encrypt algorithm, so as to encrypt the complex quadratic polynomial, the set of corresponding non-trivial zeros, and the relation between the set of non-trivial zeros and the set of switched numeric pairs; and that facilitates and enhances the processes of key exchange and authentication as well. Combining the above components in an implementation of software, hardware, or a combination of software and hardware as a quantum key-exchanging sub-unit can achieve the effect of facilitating the key exchange processes, to switch the numeric pairs formed from the quantum key states which is cloaked in the heat kernel function to the form with parameters of a super-singular elliptic curve to facilitate and enhance the processes of cryptography key exchange and authentication. This sub-unit helps to provide convenience and security for a generic quantum key during the key-exchanging processes, and this sub-unit can be implemented through a device with reasonable cost.

Referring to FIG. 10A and FIG. 10B, in the above preferred embodiment, in order to ensure the correctness and success rate in quantum key-exchanging processes, the above-mentioned quantum key-exchanging sub-unit U20302 of the key transmission unit U203 further comprises the following two components: a twin prime generator D304 and a modular matrix verifier D305. Wherein, the twin prime generator D304 will generate twin primes (primes fit the Twin Prime Conjecture) in accordance with the primes mapped from the above-mentioned non-trivial zeros derived by D303 and combine the primes derived from the non-trivial zeros with the corresponding twin primes to be a modular square matrix. Thereafter, on the receiver side, the modular matrix verifier D305 performs an inverse operation for verification processes with both of the received super-singular primes from D301 and the generated modular square matrix from D304, to confirm the correctness of the encrypted data exchange. Integrating these two components into a quantum key-exchanging sub-unit not only provides the effect of facilitating the key exchange processes, but also further ensures the correctness and success rate for quantum key exchange.

In addition, according to the combination of the technical ideas related to quantum key-exchanging sub-unit in the present invention, it can be further understood: 1) based on the embodiment that combining the ideas of Mandelbrot-set complex plane and supersingular elliptic curve for key data switching process, since such implementation relates to the combination of fractal sets and curve equations for data switching, its complexity cannot be evaluated by conventional means of exponential-and-logarithmic analysis, thus it facilitates a security application which is different from legacy high-complexity design; 2) since the variation of the Mandelbrot fractal can be iterated infinitely, it can provide a huge number of applicable elements of commutative group; thus such technical idea also facilitates an application of one-time encryption designed for use on quantum key states; 3) based on the technical combination with the above-mentioned one-time encryption design, it facilitates the application for resisting man-in-the-middle attacks as well; 4) since the related technical combinations only relates to mathematical operations, and the implementation of software does not involve a huge amount of computing resources to have practical ultra-high complexity, thus it also facilitates an application of pure software cryptography design to resist quantum brute-forcing computing; 5) since there is special relationship between the set of non-trivial zeros and the edge of clustered Mandelbrot fractals, the combination of quantum key-exchanging sub-unit related technical ideas also facilitates an application that can verify whether the transmitted data has been tampered.

Figure 11A:
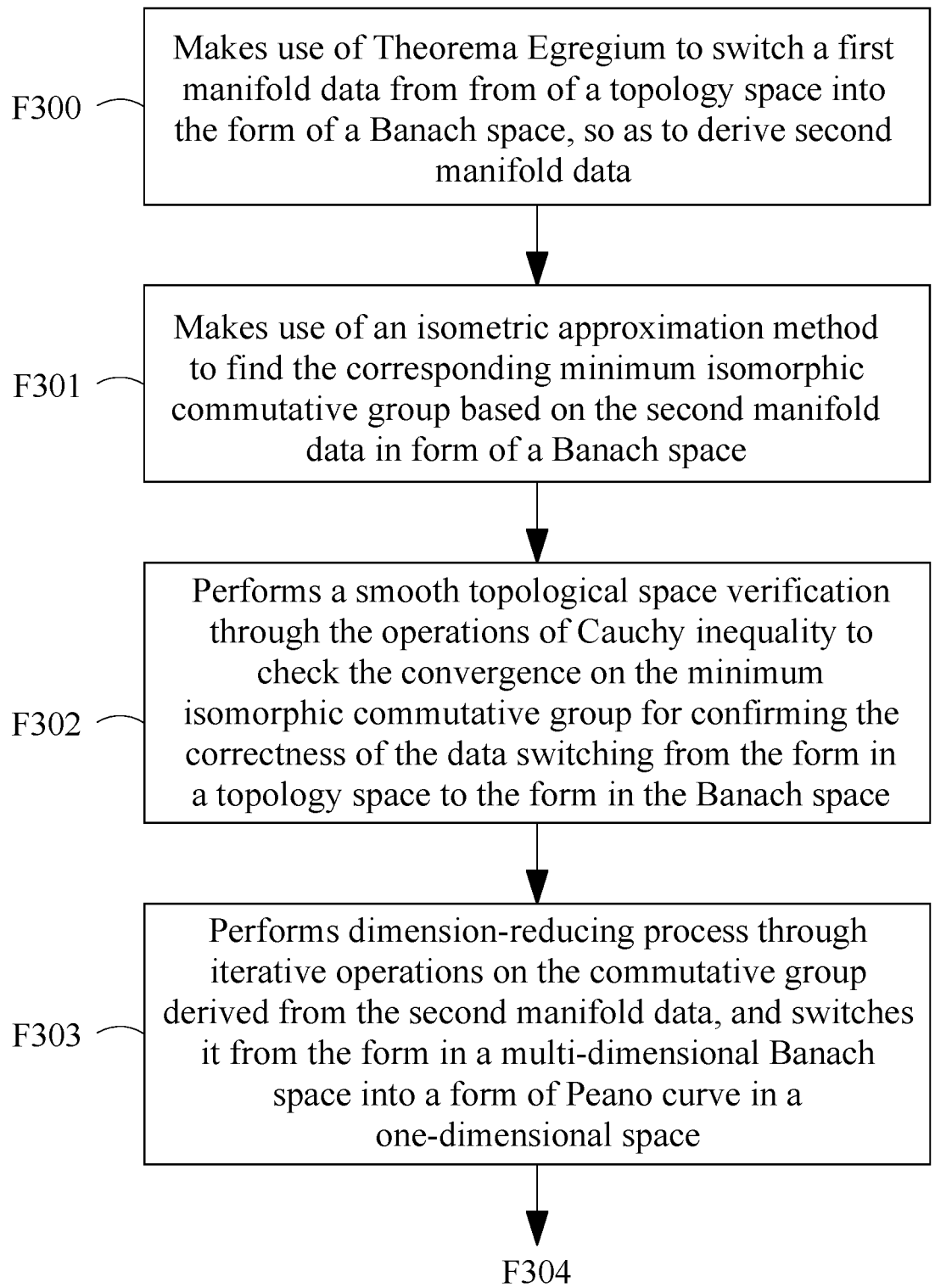
FIG. 11A is a dataflow diagram of a Banach-space computing module according to an embodiment of the present invention.

As shown in FIG. 11A and FIG. 11B, and also referring to FIG. 5, in some embodiment, the above-mentioned Banach-space computing module M1003 performs a set of operations to switch a homotopy-morphed data or a cloaked data to a data in a form of a Banach space before the pre-process performed by the above-mentioned key transmission unit U203 on the transmitter side, and then switch the data formed in a Banach space to a data in a form of a Hilbert space on the receiver side, for retrieving the original key information in a Hilbert space. Wherein the homotopy-morphed data or the cloaked data is treated as a first manifold data in a topology space, and the operations on the transmitter side include: 1) as shown in FIG. 11A, at block F300, leveraging Theorema Egregium to switch a first manifold data from a form of a topology space into a form of a Banach space, so as to derive a second manifold data; wherein the first manifold data is formed with a manifold in a topology space and the second manifold data is formed with a manifold in a Banach space; 2) as shown in FIG. 11A, at block F301, leveraging an isometric approximation method to find the corresponding minimum isomorphic commutative group based on the second manifold data; 3) as shown in FIG. 11A, at block F302, performing a smooth topological space verification through the operations of Cauchy inequality to check the convergence on the minimum isomorphic commutative group for confirming the correctness of the data switching from the form in the topology space to the form in the Banach space; 4) as shown in FIG. 11A, at block F303, performing dimension-reducing process through iterative operations on the commutative group derived from the second manifold data, and switching it from a form in a multi-dimensional Banach space into a form of a Peano curve in a one-dimensional space. After completing a security transmission with the above-mentioned key transmission unit U203 from a transmitter to a receiver and then retrieving the data in a form of a Peano curve, the other operations performed by the Banach-space computing module M1003 on the receiver side include: 1) as shown in FIG. 11B, at block F304, leveraging operations of Riemann integration to switch the received data from the form of a Peano curve into a first geometric data which is in a form of a plane; 2) as shown in FIG. 11B, at block F305, expressing the first geometric data in view of a uniformly convex Banach space, and switching it into a form of curve surface as a second geometric data; 3) as shown in FIG. 11B, at block F306, checking the result of mapping the second geometric data from a form of curved surface to a form of a super-reflexive Banach space, and confirms whether the curved-surface switching processes in a uniformly convex space fits duality and reversibility, so as to confirm whether the derived second geometric data is applicable; 4) as shown in FIG. 11B, at block F307, performing a sub-reflexive Banach operation on the second geometric data for further confirming whether the second geometric data in the form of a curved surface is differentiable; and then perform operations of dimensionality reduction and mapping process with only retaining its weak metric attributes to avoid missing significant information if the second geometric data is differentiable, and then to derive third geometric data in a form of weak-star topology; 5) as shown in FIG. 11B, at block F308, performing linear operations through a dual vector space with the basis of the Banach space to switch the third geometric data from the form of the weak-star topology to the form of a normed vector space; and 6) as shown in FIG. 11B, at block F309, mapping the data formed in a normed vector space from an inner-product space to a Hilbert space, so as to retrieve the original cryptography key information which is encoded within the form of the first manifold data. Wherein, the operations which relate to F300~F303 are performed by the Banach-space computing module M1003 on the transmitter side of a communication device C10 (shown in FIG. 3), while the operations which relate to F304~F309 are performed by the Banach-space computing module M1003 on the receiver side of a communication device C20 (shown in FIG. 3).

Figure 12:
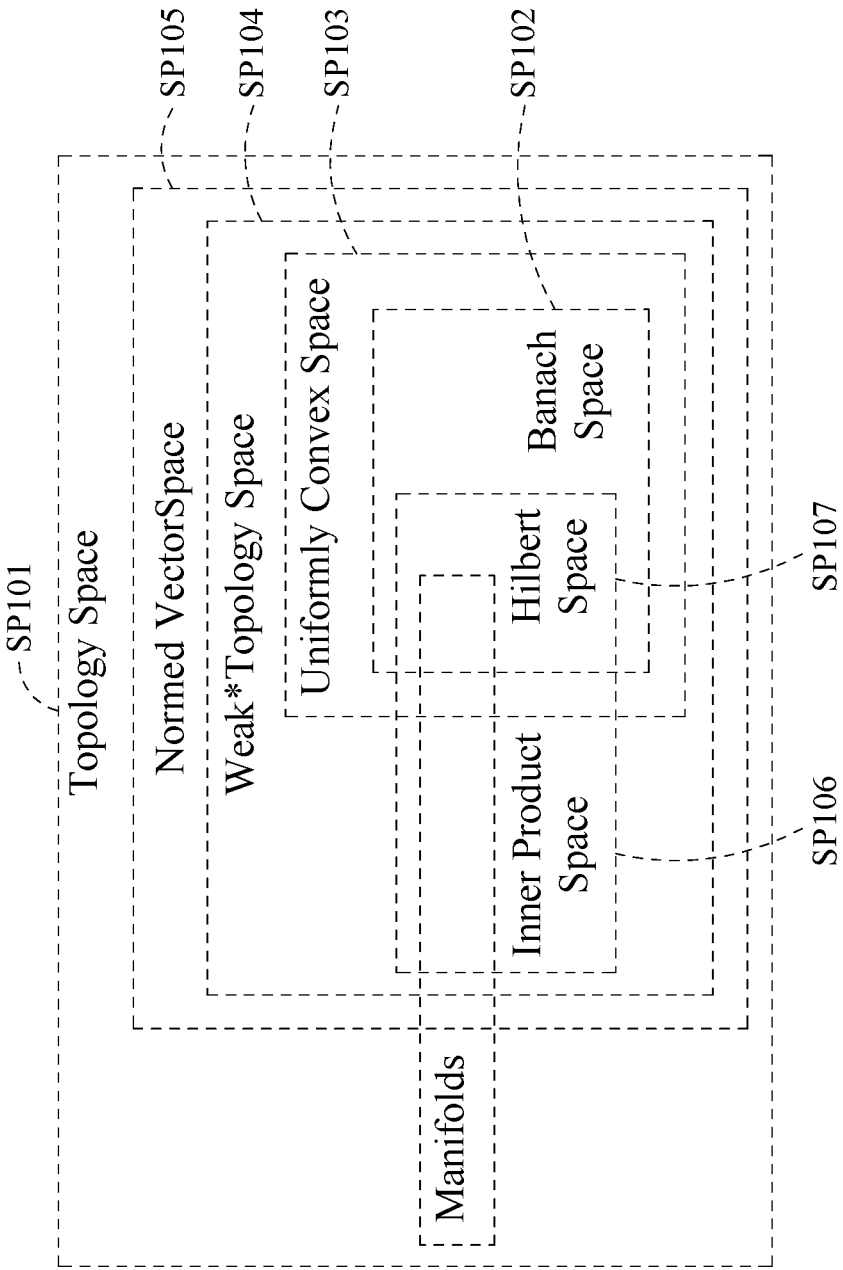
FIG. 12 is a hierarchy diagram of mathematics spaces for the Banach-space computing module according to an embodiment of the present invention.

Since the above technical idea of the Banach-space computing module M1003 relates to operations among different mathematics spaces, here provides FIG. 12 for facilitating further understanding of the present disclosure. Refer to FIG. 12, which is a hierarchy diagram to illustrate the space switching logic for the Banach-space computing module M1003 in the present invention. As shown in FIG. 12, manifold data can be switched between various mathematics spaces, wherein the M1003 makes the manifold data in a topology space SP101 be switched to a Banach space SP102 first; then performs operation to map the manifold data which is in a Banach space SP102 to a uniformly convex space SP103 based on the Banach basis; after that, the manifold data is switched to a weak* (or named as weak-star) topology space SP104; thereafter, it is switched from the weak* topology space SP104 to a normed vector space SP105 through a dual space operation with the basis of the Banach space; finally, the manifold data is switched from the normed vector space SP105 through an operation of inner product space SP106 to a target Hilbert space SP107.

Figure 13:
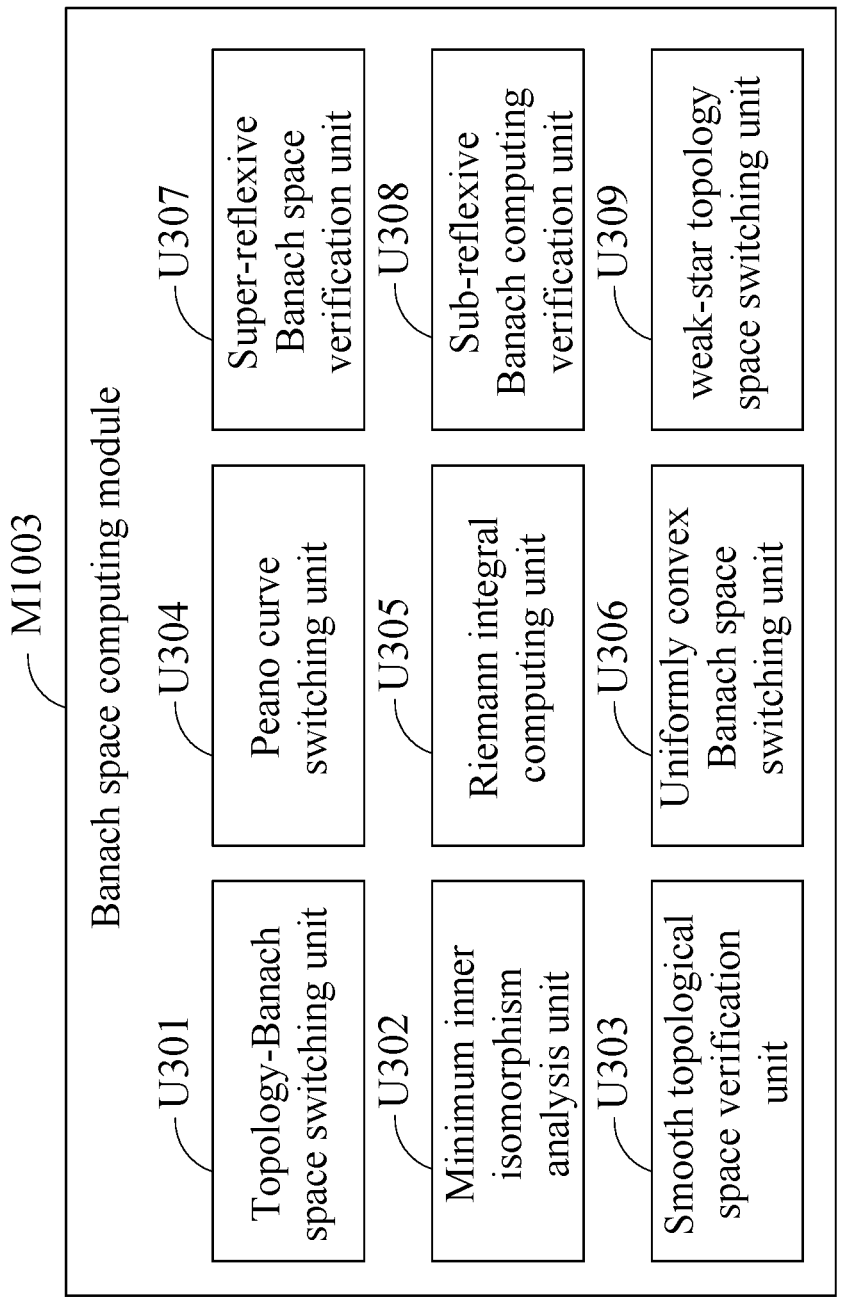
FIG. 13 is a block diagram of a Banach-space computing module according to an embodiment of the present invention.

Based on FIG. 13, in order to implement the above operations performed by a Banach-space computing module M1003, in an embodiment, the M1003 comprises the related components U301~U309 as shown in FIG. 13. The following is an introduction for the implementation of U301~U309 to support operations performed by M1003. Wherein, before the processes for M1003, the above-mentioned manifold computing module M1002A (as shown in FIG. 5) obtains first manifold data in a topology space on the transmitter side before the processes performed by the key transmission unit U203 (as shown in FIG. 8), wherein the first manifold data can be the data derived from the homotopy-morphing computing unit U201 or from the key-cloaking computing unit U202, and then M1003 drives a topology-Banach space switching unit U301 (shown in FIG. 13) to make use of Theorema Egregium on the first manifold data in a topology space through the processes of local isometry with an intrinsic invariant of a surface (such as Gaussian curvature), to switch it to the form in a Banach space to derive second manifold data; thereafter, in a Banach space, a minimum inner isomorphism analysis unit U302 will find the corresponding minimum isomorphic commutative group based on the second manifold data through the processes of an isometric approximation method; thereafter, a smooth topological space verification unit U303 performs the operation through the processes of Cauchy inequality for convergence verification on the minimum isomorphic commutative group to confirm the correctness of the data switching from the form in a topology space to the form in the Banach space; thereafter, a Peano curve switching unit U304 performs switching processes from the form in a multi-dimensional Banach space to a form of a Peano curve in a one-dimensional space, based on the commutative group derived from U302, to obtain a dimension-switched data, wherein the dimension-switched data is in a form of a Peano curve in a one-dimension space, and then dimension-switched data formed with a Peano curve will be handovered to the key transmission unit U203 for security transmission.

Still referring to FIG. 13, on the receiver side, after completing the security transmission through a communication channel, decrypting and then retrieving the data in a form of a Peano curve, a Riemann integral computing unit U305 of the Banach-space computing module M1003 switches the above dimension-switched data to first geometric data in the form of a plane via performing operations of Riemann integration; thereafter, M1003 drives uniformly convex Banach space switching unit U306 to perform the curved surface switching processes in a uniformly convex Banach space to switch the first geometric data derived from U305 to second geometric data in the form of a curved surface; thereafter, a super-reflexive Banach space verification unit U307 will check the result of mapping the second geometric data from a curved surface to a super-reflexive Banach space to confirm whether the second geometric data is applicable, and confirm whether the switching processes in a uniformly convex space fits duality and reversibility; thereafter, the sub-reflexive Banach computing verification unit U308 will perform a sub-reflexive Banach operation on the second geometric data for further confirming whether the second geometric data in the form of a curved surface is differentiable, and then perform operations of dimensionality reduction and mapping process with only retaining its weak metric attributes to avoid missing important information if the second geometric data is differentiable, and then to derive third geometric data in the form of weak* topology; and lastly, a weak-star topology space switching unit U309 performs linear operations on the third geometric data in a dual vector space with the basis of the Banach space, to switch the third geometric data from the form of the weak-star topology to the form of a normed vector space, wherein the switched third geometric data in the form of the normed vector space can retrieve the original cryptography key information in a Hilbert space via conducting the inner product operations and completeness. Combining the above units in an implementation of software, hardware, or a combination of software and hardware as a Banach-space computing module can achieve the effect of key space switching, to be coupled to the manifold computing module to facilitate the quantum computing-threat-resistant processes for key exchange in the topology spaces, thereby the processes are performed to switch the first manifold data from a topology space through a Banach space to a Hilbert space for retrieving the original key information after the generic key-exchanging processes. That will make a generic quantum computing in a Hilbert space fail to get involved in the key-exchanging processes enhanced by the embodiments of the present invention.

In addition, according to the combination of the technical ideas related to Banach-space computing module in the present invention, it can be further understood: 1) since the data dimension and the basis of key states is different from a conventional data which is operated in a Hilbert space, such implementation is difficult to be identified the node of transmitter or receiver by means of quantum computing, so as to facilitate an application for resisting protocol-analyzer crack; 2) since the data switching processes in a Banach space relates to operations of dual vector spaces, once the data is tampered in a transmission, the operation of dual vector spaces will be failed, thus such implementation facilitates an application with effect equivalent to a cryptography hash function; 3) based on the switching relationship among mathematics spaces, a Banach space is applicable to perform operations for a plurality of a Hilbert spaces, thus such implementation facilitates an application to support multiple quantum keys at the same time; 4) based on the combination of the above technical ideas, it is also applicable to make use of multiple Hilbert spaces for providing a plurality of security channels at the same time, thus it facilitates an application on quantum key exchange via hopping transmission as well; and 5) since the data in a form of a Banach space can efficiently avoid conventional brute-forcing computing, the Banach-space computing module related technical ideas facilitate an application of security temporary-storage solution.

Based on the above description, and also referring to FIG. 3~FIG. 5, it can be seen that the present invention provides an enhanced process and solution for key-exchanging processes. Taking an example of the system in FIG. 5, the combination of the units in linear-space computing module M1001A is sufficient to simulate various quantum logic gates and cyclic-group modular-polynomial operations, thereby the system can re-encode for a quantum key or legacy key, so as to leverage technologies of homotopy morphing and key cloaking provided by the manifold computing module M1002A for switching key data to an output data type with high-strength security, wherein the output data type cannot be compromised by inverse operations, can be authenticated, can be verified for completeness of data transmission, and can protect being cracked from functional analysis; meanwhile, by means of the Banach-space computing module M1003, the system can switch key information (including: conformal information for manifold switching, dimensional information, curvature information, corresponding tensor metrics, Lorentzian metrics, and so on) from a manifold data type to a form in a non-Hilbert space first, and then retrieve it in a Hilbert space after data transmission, so as to facilitate and enhance encoding and decoding on manifold data, thereby the system will avoid possible threats from quantum brute-forcing operation. In addition, in some embodiments, the above-mentioned homotopy-morphing computing unit or the key-cloaking computing unit can be implemented optionally in the system, and the following provides instances for reference.

Figure 14:
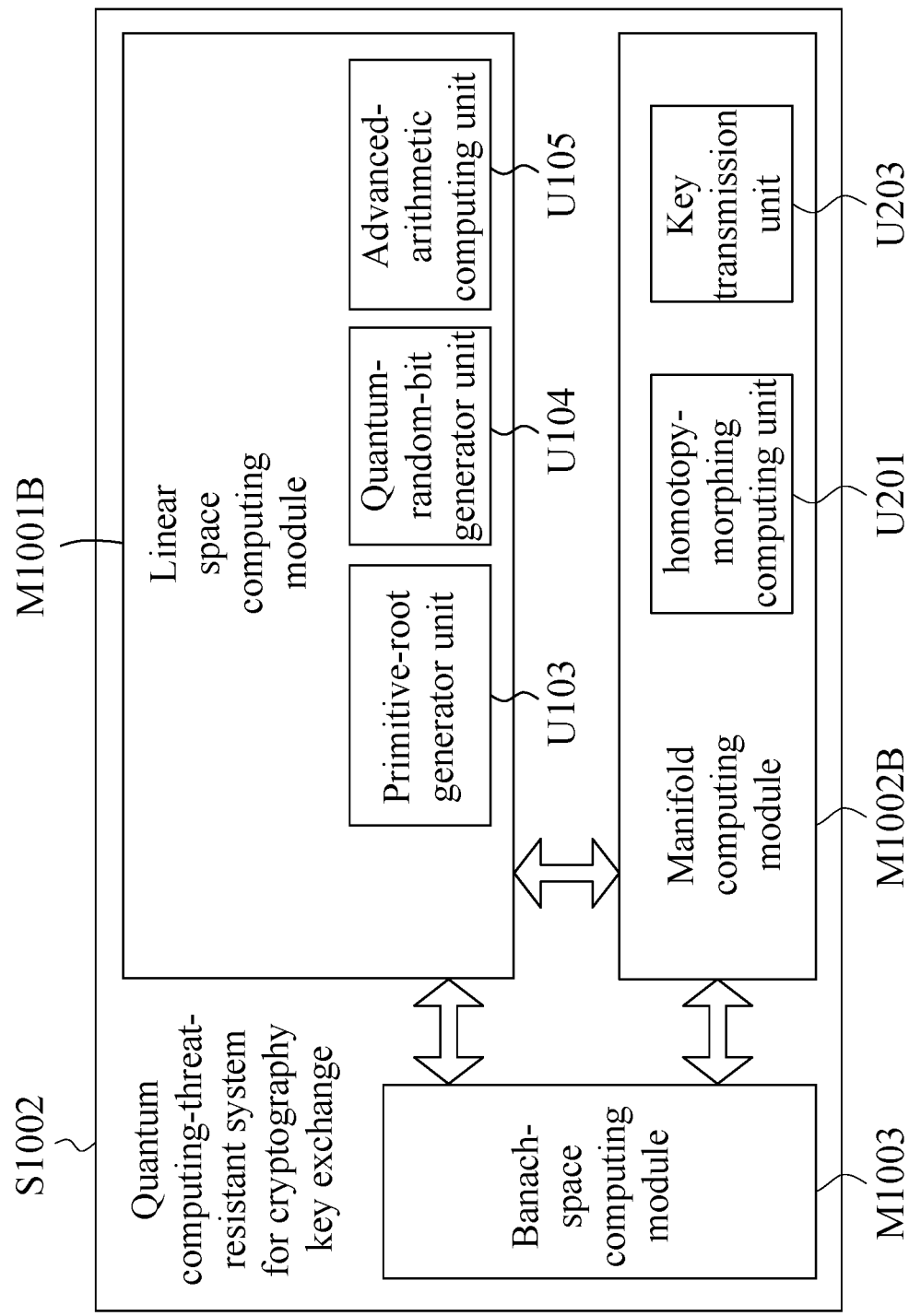
FIG. 14 is a structural block diagram of a quantum computing-threat-resistant system for cryptography key exchange according to an embodiment of the present invention.
Figure 15A:
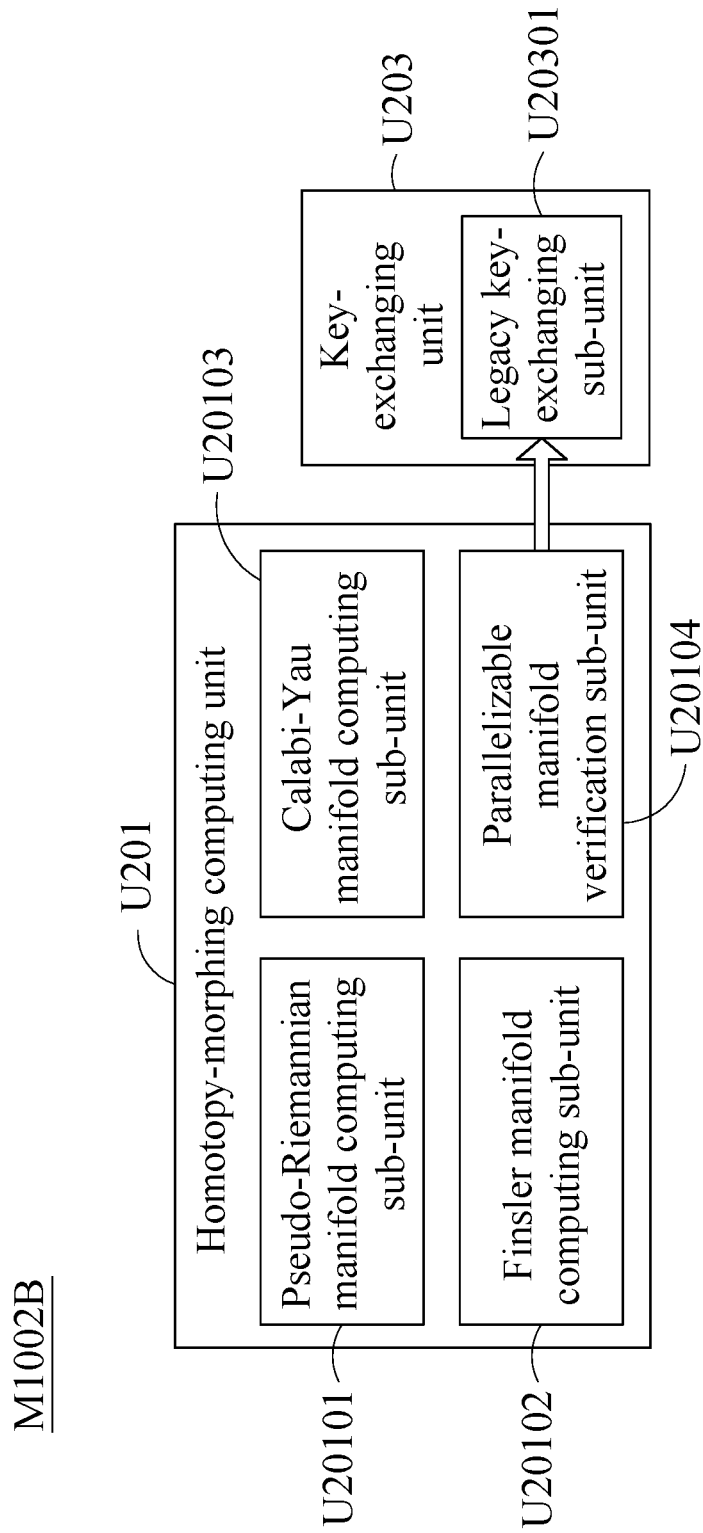
FIG. 15A is a structural block diagram of a manifold computing module according to an embodiment of the present invention.

The quantum computing-threat-resistant system for cryptography key exchange can be implemented in an application scenario where legacy keys are used. Please refer to FIG. 14, which is a structural block diagram of a system according to an embodiment of the present invention. As shown in FIG. 14, a quantum computing-threat-resistant system for cryptography key exchange S1002 includes a linear-space computing module M1001B, a manifold computing module M1002B and a Banach-space computing module M1003. The difference between the quantum computing-threat-resistant system for cryptography key exchange S1002 as shown in FIG. 14 and the one S1001 as shown in FIG. 5 is that the manifold computing module M1002B can at least implement the homotopy-morphing computing unit U201 in the embodiment of FIG. 14; therefore, the quantum-operators-integration computing unit U101 and the commutative-operator processing unit U102 in the linear-space computing module M1001B are optional, so it is applicable not to implement the quantum-operators-integration computing unit U101 and the commutative-operator processing unit U102 in this kind of embodiment. Please refer to FIG. 15A, which is a structural block diagram of a manifold computing module to an embodiment of FIG. 14. As shown in FIG. 15A, the manifold computing module M1002B includes a homotopy-morphing computing unit U201 (that is, the switching-operation & mapping-process unit U200 as shown in FIG. 1 includes the homotopy-morphing computing unit U201) and the corresponding key transmission unit U203 comprising a legacy key-exchanging sub-unit U20301, which can be implemented with reference to the aforementioned corresponding embodiments (see FIG. 8, FIG. 10A, and FIG. 10B). This embodiment may save the initial cost of equipment when the present invention is applied to a legacy key-exchanging system.

The quantum computing-threat-resistant system for cryptography key exchange can be implemented in an application scenario where quantum keys are used. Please refer to FIG. 8, in another embodiment of the quantum computing-threat-resistant system for cryptography key exchange, in the case for quantum keys, the homotopy-morphing computing unit U201 and the key-cloaking computing unit U202 can be implemented in combination. The system can perform the operations of homotopy morphing on U201 for quantum keys first, thereafter perform the key-cloaking processes on U202, and then perform the processes of the quantum key-exchanging sub-unit U20302. This embodiment can implement the highest-strength security mechanism of the present invention.

The quantum computing-threat-resistant system for cryptography key exchange can be implemented in an application scenario where quantum keys are used. Please refer to FIG. 8, in an embodiment of the quantum computing-threat-resistant system for cryptography key exchange, in the case for quantum keys, the homotopy-morphing computing unit U201 can be coupled to the system in standalone mode without implementing U202. The system can perform the operations of homotopy morphing on U201 for quantum keys first, and then perform the processes of the legacy key-exchanging sub-unit U20301. This embodiment can implement an evasive security mechanism of the present invention for cloaked quantum keys to be exchanged through legacy channels.

Figure 15B:
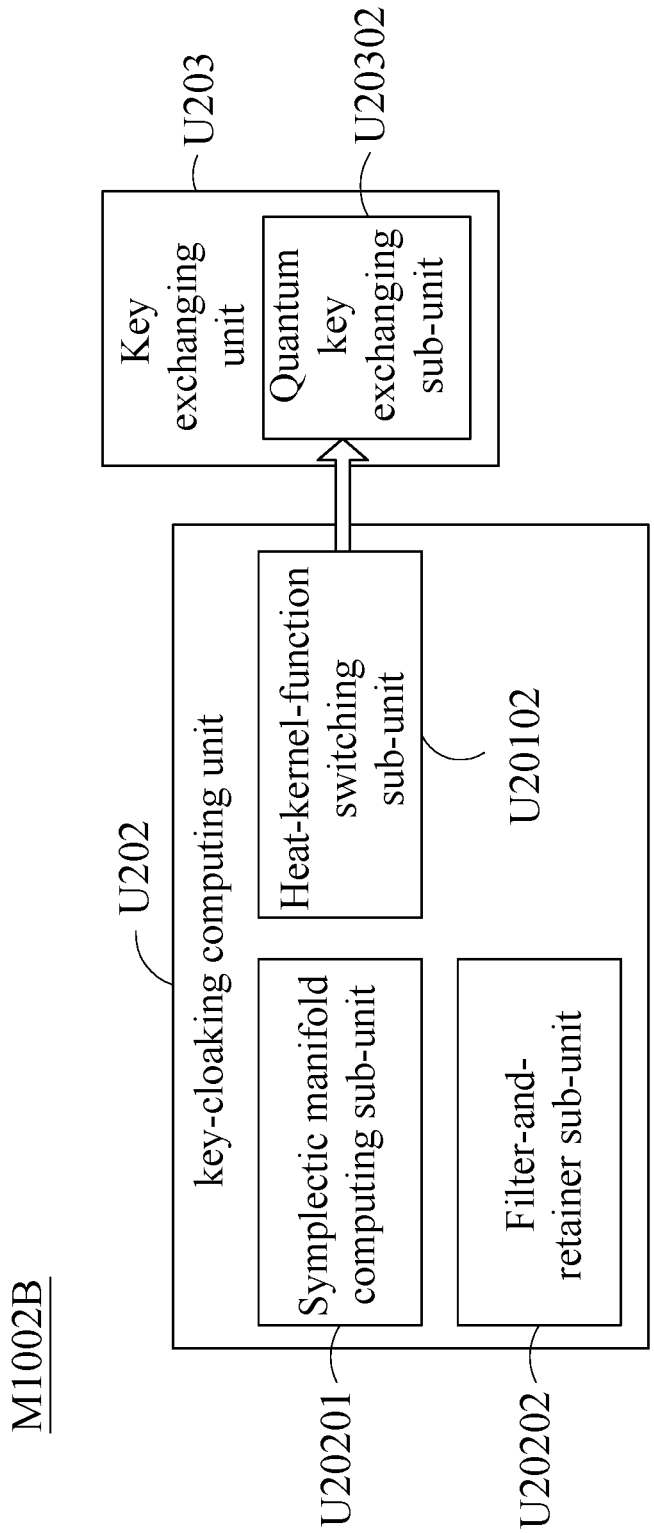
FIG. 15B is a structural block diagram of a manifold computing module according to an embodiment of the present invention.
Figure 16:
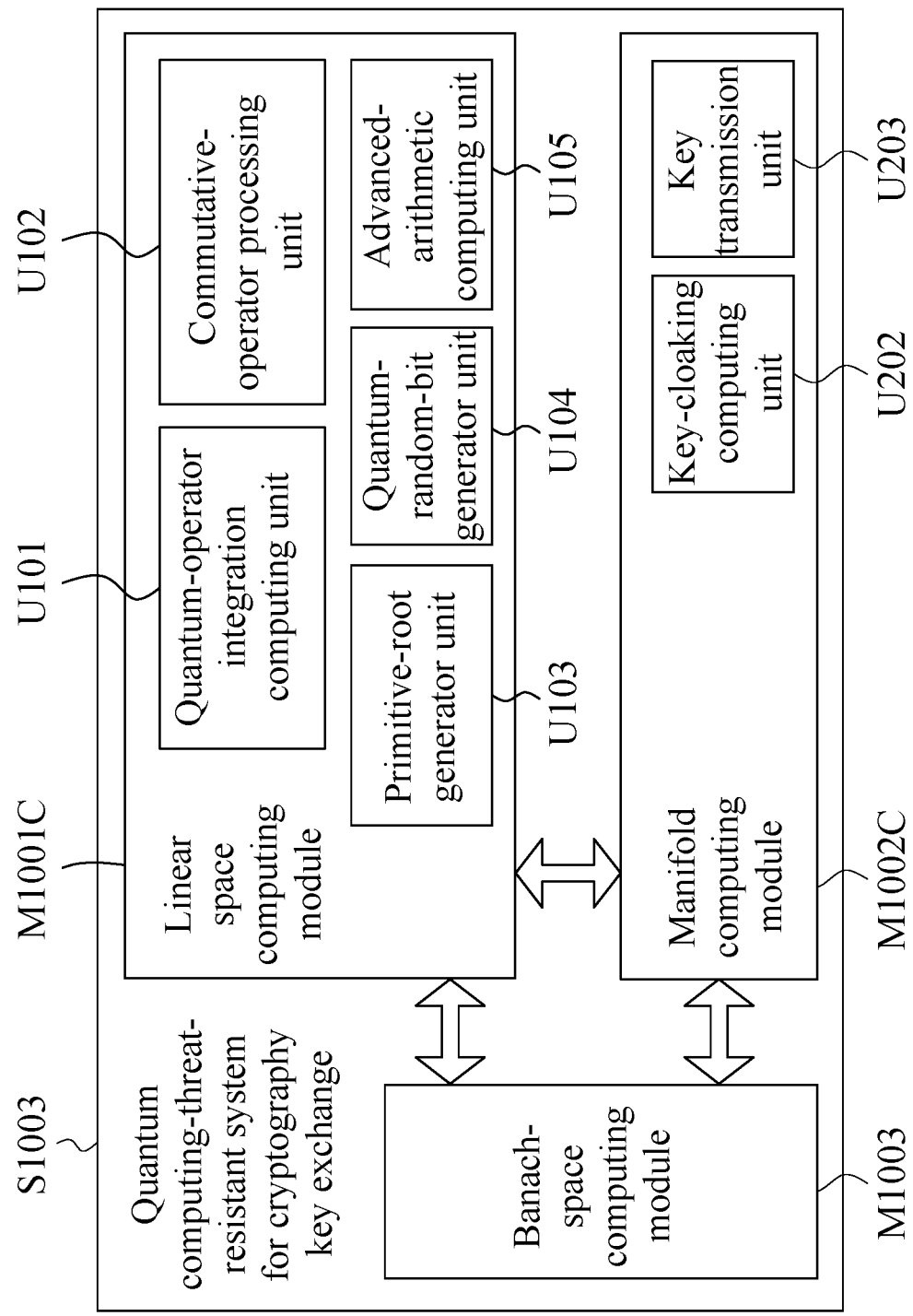
FIG. 16 is a structural block diagram of a quantum computing-threat-resistant system for cryptography key exchange according to an embodiment of the present invention.

The quantum computing-threat-resistant system for cryptography key exchange can be implemented in an application scenario where quantum keys are used. Please refer to FIG. 16, in an embodiment of the quantum computing-threat-resistant system for cryptography key exchange S1003, in the case for quantum keys, at least comprises: a linear-space computing module M1001C; a manifold computing module M1002C; and a Banach-space computing module M1003. The difference between the quantum computing-threat-resistant system for cryptography key exchange S1003 as shown in FIG. 16 and the one S1001 as shown in FIG. 5 is that the manifold computing module M1002C can at least implement the key-cloaking computing unit U202 in the embodiment of FIG. 16. Please refer to FIG. 15B, which is a structural block diagram of a manifold computing module to an embodiment of FIG. 16. As shown in FIG. 15B, the manifold computing module M1002C includes a key-cloaking computing unit U202 (that is, the switching-operation & mapping-process unit U200 as shown in FIG. 1 includes the key-cloaking computing unit U202) and the corresponding key transmission unit U203 comprising a quantum key-exchanging sub-unit U20302, which can be implemented with reference to the aforementioned corresponding embodiments (see FIG. 8, FIG. 10A, and FIG. 10B).

Thus, the above several embodiments present the quantum computing-threat-resistant system for cryptography key exchange, and they can be further implemented as mechanisms for homotopy-morphing operations or for key-cloaking processes, or as mechanisms for both homotopy-morphing operations and key-cloaking processes. This technology can be implemented as a quantum computing-threat-resistant device or system with a high strength scheme of cryptography key exchange, and can be implemented on the transmitter side and the receiver side for data communication. In some embodiments, the present technology can be compatible with the operations of legacy cryptography key and quantum cryptography key in different mathematics spaces. That not only effectively avoids generic quantum computing attacks during the key-exchanging processes, but also can be implemented by devices with reasonable cost. It facilitates overcoming the bottleneck related to the requirement of heavy-cost devices for most conventional PQC solutions. For example, the corresponding implementation for the homotopy-morphing mechanism can be performed in a computing device (such as a computer or a server with an efficient processor or graphics processor) that belongs to a legacy computer (as opposed to a quantum computer). So far, based on the understanding of the related technical ideas of the above-mentioned linear-space computing module, manifold computing module and Banach-space computing module of the present invention, it can further facilitate: 1) applications on simulations for quantum logic gates via use of software modules; 2) applications with matrix operations of duality switching, dimension switching, mapping and so on, which can be applied to the field of cryptography to design proprietary one-way functions with high-strength security; 3) applications to leverage data switching operations among non-Hilbert spaces and Hilbert spaces for designing various transmission protocols to prevent brute-forcing attacks.

Figure 17A:
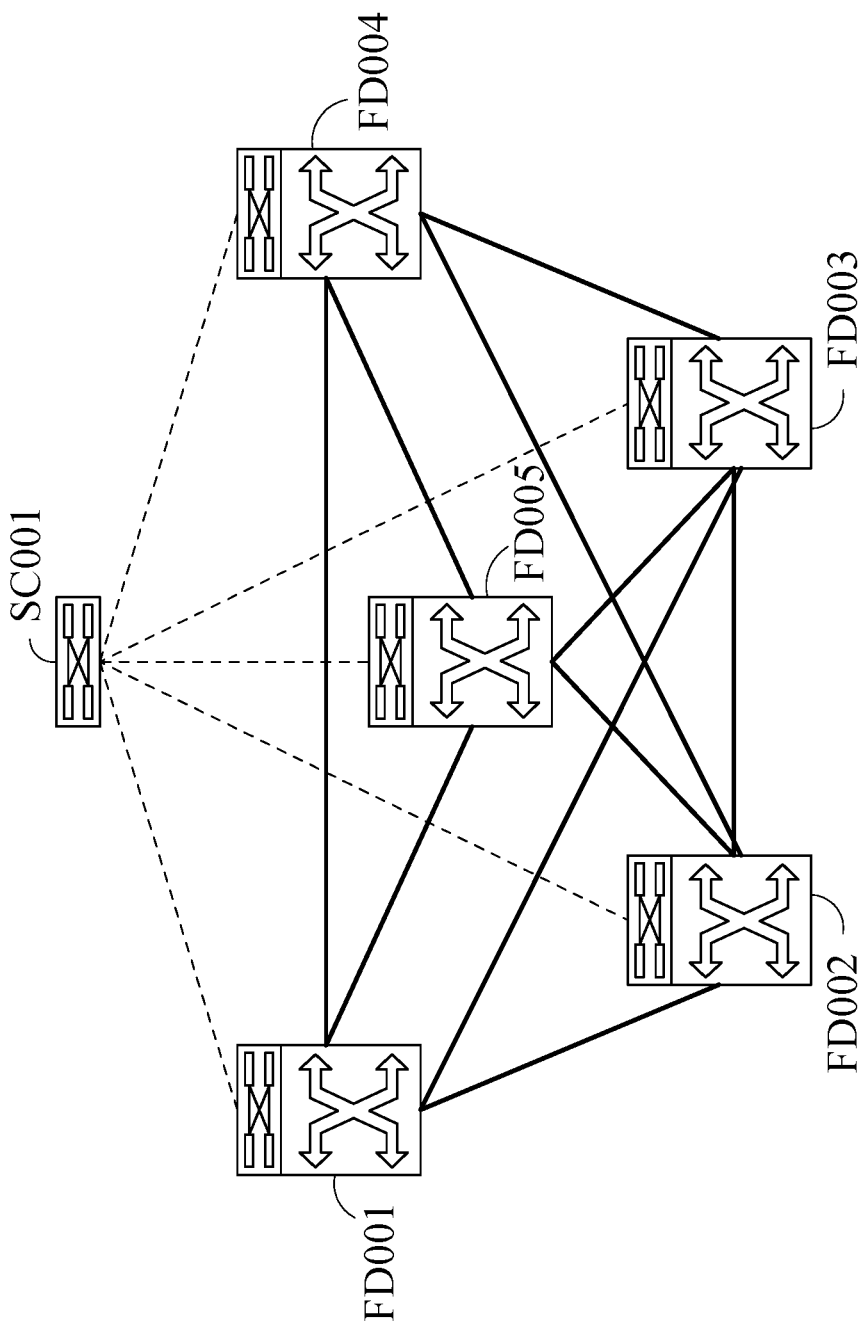
FIG. 17A is a schematic diagram of a system according to an embodiment of FIG. 5.
Figure 17B:
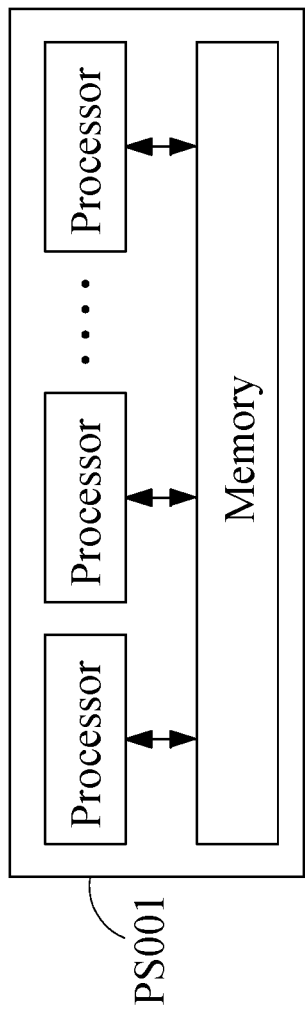
FIG. 17B is a schematic diagram of a computing device according to an embodiment of the present invention.

In addition to the above embodiments for the technologies of the present invention, there is an example of the system S1001 implemented based on FIG. 5 for reference. This example is constructed with conventional approaches of SDN (Software Defined Networking)/NFV (Network Function Virtualization). Referring to both FIG. 5 and FIG. 17A, for example, the linear-space computing module M1001A can be implemented as a specific computing network with SDN approach, as exemplified in FIG. 5. A manager software application of the linear-space computing module M1001A can be installed in a server SC001 which plays the role of an SDN controller as well. Each unit (U101-U105) of the linear-space computing module M1001A can be installed on each forwarding device (FD001-FD005) of the specific computing network. Each forwarding device (FD001-FD005) can receive the management instructions of the linear space computing module M1001A from the server SC001 and send back the performing results of each unit (U101-U105) to the server SC001 as well. Since FD001-FD005 are forwarding devices of conventional SDN, there is a decoupled controller (e.g., represented by a block communicatively coupled to the server SC001 through a link represented by a dashed line) on each forwarding device so that the forwarding devices (FD001-FD005) can communicate with each other based on the functional requirement of each unit (U101-U105). For example, the primitive-root generator unit U103 is installed on FD003, and the quantum-random-bit generator unit U104 is installed on FD004. Once the system S1001 need to derive an applicative cyclic group, the manager application of M1001A installed on SC001 will send corresponding instructions to FD003 and FD004, and then the decoupled controller on FD004 will help to send the quantum random bit generated by U104 to FD003, thus U103 can derive applicative algebraic cyclic group in the linear space with true randomness. However, a forwarding device can be a tower station or a virtual machine, etc. and it depends on the required specification of each unit. For example, the forwarding device for supporting the commutative-operator processing unit U102 may be implemented by a computing device, such as a micro server with a parallel system, indicated by PS001, as shown in FIG. 17B. Referring to FIG. 17B, the computing device may include a plurality of physical processors with a concurrent memory to support some quantum computing with matrix operations. For another example, the forwarding device for supporting the primitive-root generator unit U103 can be implemented by a computing device, such as an IOT (internet of things) device.

Figure 17C:
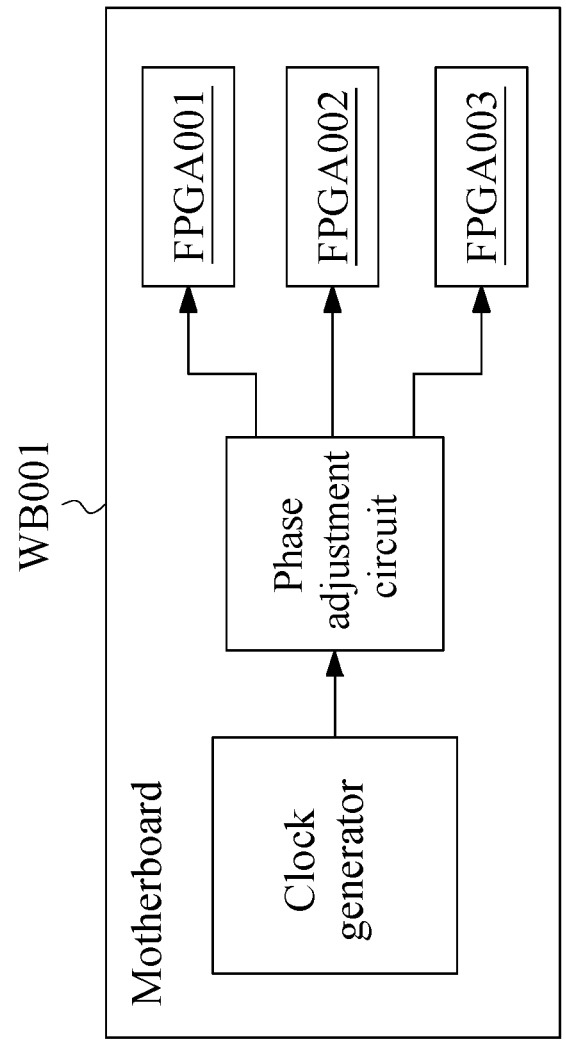
FIG. 17C is a schematic diagram of a computing device according to an embodiment of the present invention.

Referring to the above examples, the manifold computing module M1002A and the Banach-space computing module M1003 can be implemented in the similar way. The modules (M1001A, M1002A, and M1003) of the system S1001 are working on an infrastructure coordinated with NFV approaches. However, the forwarding device for supporting the key transmission unit U203 should be able to play a role of a transceiver for quantum communication. The example of the system S1001 is for the sake of illustration only, and the implementation of the invention is not limited thereto. For example, the forwarding device can be implemented as a part of a distributed system or commodity servers as well, and the SDN is possible to be replaced with any traditional network or an intranet formed with stand-alone computers. In some embodiments, all of the SDNs for the implementation of each module can be integrated into a huge server with various micro systems. In another example of S1001, the forwarding device FD005 for performing the role of advanced-arithmetic computing unit U105 can be designed as a computing device, such as a computing workbench WB001 with a plurality of embedded FPGAs (as shown on FIG. 17C), wherein the computing workbench includes a motherboard which can provide different user-defined clocks to different FPGA modules (e.g., FPGA001-FPGA003) for performing roles as various sub-units (e.g., U10501-U10503 as shown in FIG. 7) of the advanced-arithmetic computing unit U105. The computing workbench, for example, may employ a clock generator to provide one or more clocks, or further optionally use a phase adjustment circuit to provide different clocks at different frequencies.

Figure 17D:
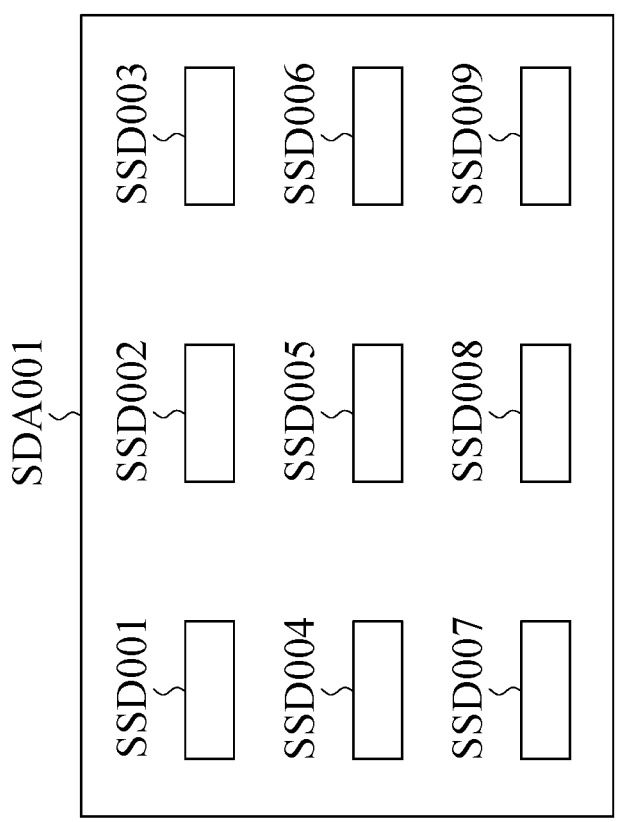
FIG. 17D is a schematic diagram of an SSD array according to an embodiment of the present invention.

In an example of S1001, each unit (U301-U309 as shown in FIG. 13) of the Banach-space computing module M1003 can be implemented as a part of a non-transitory machine-readable medium (e.g., an SSD (solid-state device) array SDA001 in this example, as shown in FIG. 17D), and each part of the non-transitory machine-readable medium stores a set of specific instructions. Referring to FIG. 5 and FIG. 13, U301-U309, for instance, can be implemented into SSD001-SSD009, and the SSD array SDA001 is located in a server which is an SDN controller with multiple physical processors. For example, a manager software application of M1003 is installed in this SDN controller, and the application can access SSD001-SSD009 to coordinate U301-U309 to be executed by one or more processors for performing the various switching processes between a topology space and a Banach space.

While the present disclosure has been described by means of specific embodiments, numerous modifications and variations could be made thereto by those skilled in the art without departing from the scope and spirit of the present disclosure set forth in the claims.

What is claimed is:

1. A quantum computing-threat-resistant system for use in cryptography key-exchanging processes, the system comprising:
    a) a linear-space computing module, for supporting basic linear space operations, the linear-space computing module including:

1) a primitive-root generator unit for deriving applicative cyclic group in a linear space;
2) a quantum-random-bit generator unit for providing true randomness for the primitive-root generator unit; and
3) an advanced-arithmetic computing unit for providing computing capability of modulo powers for data formed with algebraic structures;

b) a manifold computing module, coupled to the linear-space computing module, for supporting manifold topology computing for a cryptography key, the manifold computing module including:
1) a switching-operation & mapping-process unit for performing manifold topology operations for the cryptography key to derive a switched key data; and
2) a key transmission unit for mapping the switched key data on a transmitter side to a data type in form for security transmission, or for receiving and decrypting the data in form for security transmission on a receiver side, so as to facilitate and enhance cryptography key-exchanging processes; in order to facilitate and enhance quality of quantum communication as well, wherein the key transmission unit further comprises:
a quantum steering sub-unit which is for a quantum channel to perform quantum communication with quantum steering mechanism; and
a Bell measurement sub-unit for confirming whether there is decoherence issue with current quantum communication in a quantum channel; and c) a Banach-space computing module, coupled to the linear-space computing module and the manifold computing module, for supporting the manifold computing module to switch a proprietary encoded data from a form of topology space to a form of Banach space, so as to facilitate the quantum computing-threat-resistant operations for key-exchanging processes; and then switching the proprietary encoded data into a form of Hilbert space through a switching process based on a basis of Banach space, so as to retrieve the original cryptography key information.

2. The quantum computing-threat-resistant system for use on cryptography key-exchanging processes according to claim 1, wherein the switching-operation & mapping-process unit of the manifold computing module comprises at least one of the following units:
a) a homotopy-morphing computing unit for performing homotopy morphing operations on a legacy key or a quantum key, wherein the operation makes use of metrics in a mathematics space to express the encoded data of key information, and then performs dimension switching processes, so as to derive a homotopy-morphed key data as the switched key data; wherein the switched key data is in form of a manifold; and
b) a key-cloaking computing unit, for performing cloaking process on a quantum key, or on a homotopy-morphed key data derived from a homotopy-morphing computing unit, wherein the cloaking process makes use of phase-space modeling and time factors to implement block cipher, so as to derive a cloaked key data as the switched key data;
wherein the switched key data is formed with parameters of a heat kernel function implying key states or key information of a cryptography key.

3. The quantum computing-threat-resistant system for use on cryptography key-exchanging processes according to claim 1, wherein the linear-space computing module further comprises:
a quantum-operator-integration computing unit for supporting basic quantum operations in a linear space; and
a commutative-operator processing unit for maintaining the completeness of the original cryptography key information;
wherein the operations performed by the quantum-operator-integration computing unit includes:
performing unitary transformation for linear matrices;
performing dimension-reduction process on a unitary matrix in hyperspace;
performing a verification of orthonormality for the bases of a vector space;
performing inner product operations for a vector space;
performing eigenization process for a vector space so as to derive corresponding eigen value and eigen vector;
checking whether a quantum operator for use is a Hermitian operator;
finding the quantum transition probability for a ground state via analysis on collision cross section;
leveraging Laplace transform to derive wave vectors which are perpendicular with each other in a vector space; and
making use of applicable conversion operators to switch a vector space to a conjugated complex space.

4. The quantum computing-threat-resistant system for use on cryptography key-exchanging processes according to claim 3, the system provides operations for maintaining the completeness of the original cryptography key information, wherein the operations comprise:
performing non-orthogonal conversion on the observed quantum states to derive eigen states projected on an orthogonal coordinate system first;
validating whether a Hermitian transform is applicable for the derived eigen states;
performing phase correction on the derived eigen states if any degenerated state is found after Hermitian transform; and
making use of C.S.C.O. (complete set of commuting observables) to recover the degenerated state if there is still degenerated state after performing phase correction.

5. The quantum computing-threat-resistant system for use on cryptography key-exchanging processes according to claim 1, wherein the advanced-arithmetic computing unit of the linear-space computing module comprises:
an algebraic-ring computing sub-unit which provides dual operators to support maintenance and computing processes for data on an algebraic ring;
a Galois-group computing sub-unit which provides modular arithmetic of polynomial for deriving applicable Galois group and performing computing processes for it; and
a root modulo powers of squaring process sub-unit which makes use of Euler's theorem and Fermat's little theorem to support squaring processes for root modulo powers.

6. The quantum computing-threat-resistant system for use on cryptography key-exchanging processes according to claim 2, in order to ensure the correctness and success rate of key-cloaking computing performed by the transmitter and receiver over a key-exchanging process, wherein the key-cloaking computing unit of the manifold computing module further comprises:
- a quantum-decoherence filter which makes use of Hermitian transform for filtering out decohered quantum states;
- a probability-threshold sifter for sieving the quantum states whose probability of occurrence is higher than a configured threshold based on corresponding wave function; and
- an information retainer for retaining significant information which is on a non-manifold edge, after conformal mapping operations on the encoded data which is corresponding to the combination of quantum key states.

7. The quantum computing-threat-resistant system for use on cryptography key-exchanging processes according to claim 1, wherein the key transmission unit of the manifold computing module adopts corresponding enhancements on key-exchanging processes in accordance with the data source of the switched key, the enhancements comprise:
- operations to enhance the legacy key-exchanging processes, for a switched key data derived from the homotopy-morphing computing unit of the manifold computing module, wherein the operations switch the switched key data from form of a manifold into form of integral data derived with an integral equation of a curvature polynomial, parameterize the curvature polynomial expressed for the integral data, and then make use of a partial differential equation evoluted over time, so as to facilitate and enhance the key-exchanging processes via a legacy communication channel;
- operations to enhance the quantum key-exchanging processes, for a switched key data derived from the key-cloaking computing unit of the manifold computing module, wherein the operations switch the key data with form of numeric pairs to a complex plane derived by an infinite iteration process, wherein the mentioned switched key data is cloaked in a heat kernel function and is corresponding to the combination of the quantum key states; based on the numeric pairs, to find the non-trivial zeros closed to the corresponding coordinates of the complex plane, and then make the set of all corresponding non-trivial zeros, the numeric pairs on the complex plane and the derived parameters of the complex plane, be coupled to a super-singular elliptic curve for performing encryption processes, so as to facilitate and enhance key-exchanging processes and key authentication.

8. The quantum computing-threat-resistant system for use on cryptography key-exchanging processes according to claim 2, in order to facilitate and enhance the key-exchanging processes in a legacy communication channel, the manifold computing module further comprises a legacy key-exchanging sub-unit, and the legacy key-exchanging sub-unit includes:
- a topology surface switching processor to process manifold data derived from the homotopy-morphing computing unit so as to makes use of the Chern-Gauss-Bonnet theorem to switch the manifold data from a form of a closed even-dimensional Riemannian manifold to a form derived with the integral equation of the curvature polynomial; and
- a nonlinear partial differential processor for delivering all the curvature parameters of the curvature polynomial via various nonlinear parabola partial differential equations evoluted over time.

9. The quantum computing-threat-resistant system for use on cryptography key-exchanging processes according to claim 2, in order to facilitate and enhance the key-exchanging processes in a quantum communication channel, the manifold computing module further comprises a quantum key-exchanging sub-unit, and the operations performed by the quantum key-exchanging sub-unit include:
- switching the data of quantum key states cloaked in form of heat kernel function to a complex plane of a Mandelbrot set which is generated by an infinite-iteration process; so as to make the data of key information as a set of numeric pairs expressed by the coordinate of the complex plane, wherein the cloaked data is corresponding to combination of quantum key states;
- finding the non-trivial zeros which are closed to Riemann zeta function under Riemann hypothesis in accordance with a complex quadratic polynomial, wherein the complex quadratic polynomial is expressed for the edge of fractals on the complex plane of the Mandelbrot set;
- selecting an applicable super-singular elliptic curve, and using super-singular primes which fit a Galois group as generation points to derive encryption parameters for use in simulation of the ElGamal encrypt algorithm; so as to encrypt the complex quadratic polynomial, the set of corresponding non-trivial zeros, and the relation between the set of non-trivial zeros and the set of switched numeric pairs;
- generating twin primes which fit a form of twin prime conjecture in accordance with the primes mapped from the found non-trivial zeros; and
- then in accordance with the primes mapped from the found non-trivial zeros and the corresponding generated twin primes, constructing a square matrix for use in modular operations; and
- performing inverse operation for verification on the receiver side with the received primes and the modular square matrix which is derived on the transmitter side, so as to confirm the correctness of the encrypted data exchange.

10. A quantum computing-threat-resistant method for use in cryptography key-exchanging systems, the method comprising:
a) re-encoding a quantum key or a legacy key on hand in a proprietary way to derive a proprietary encoded data equivalent to the cryptography key information by leveraging a combination of linear-space computing and operation in accordance with the data type of a quantum cryptography key or a legacy cryptography key which is operated in a Hilbert space;
  - wherein the computing and operation optionally performs instructions of quantum operation, commutative operation , primitive-root computing, and arithmetic computing, for performing simulations of quantum logic gates, operations of cyclic group, and modular arithmetic of polynomial;
b) switching the encoded data of key information to an output data of switched key formed with high-strength security by leveraging homotopy-morphing computing means and key-cloaking computing means; wherein the homotopy-morphing computing means relate to manifold computing and operation, and the key-cloaking computing means relate to time-variant function mapping and operation;
c) switching the output data into an encrypted form for security transmission according to the data source of the above-mentioned switched key, leveraging partial differential equation of time-variant function or encryption with complex-plane transform; wherein the data in form for security transmission cannot be compromised by inverse operations, can be authenticated, can be verified for completeness of data transmission, and can protect being cracked from functional analysis;

d) switching the data from a form of manifold in a topology space into a form of Peano curve in a Banach space for the above-mentioned output data derived by homotopy-morphing computing means or key-cloaking computing means, before being switched into an encrypted form for security transmission, treating the output data as a manifold data meanwhile leveraging operations of data type switching in a Banach space;

e) after receiving the encrypted data for security transmission and decrypting it, the receiver side retrieving the data in form of Peano curve, and then switching it from form of Peano curve in Banach space into a form of Hilbert space, so as to retrieve the encoded data of key information based on a manifold data type; and f) retrieving the original key information from the encoded data for a quantum key or a legacy key;

in order to achieve the effect of avoiding brute-forcing performed with quantum computing.

11. The quantum computing-threat-resistant method for use in cryptography key-exchanging systems according to claim 10, wherein the mentioned homotopy-morphing computing means relates to mapping processes with algebraic data structures based on homotopy morphing operations, and the operations comprise:

switching an encoded data of key information into a Lorentzian manifold model by leveraging metric tensor of a pseudo-Riemannian manifold so as to derive an encoded data in form of a Lorentzian manifold;

switching the encoded data from a form of Lorentzian manifold to a form of Finsler manifold by leveraging operations of differential manifold to promote the metrics of Lorentzian manifold to a Finsler space;

switching the encoded data from the form of Finsler manifold in a complex three-dimension space to a form of Calabi-Yau manifold by leveraging Calabi-Yau quantic polynomial; and verifying whether the encoded data in the form of Calabi-Yau manifold is applicable in a form of parallelizable manifold as well, so as to confirm whether the final result of homotopy-morphing computing is applicable.

12. The quantum computing-threat-resistant method for use in cryptography key-exchanging systems according to claim 10, wherein the mentioned key-cloaking computing means relates to data mapping processes and block cipher operations via making use of mathematics spaces and time factors, and the processes and operations comprise:

performing Symplectic manifold modeling with phase spaces on the encoded data of quantum key states, so as to derive a linear Symplectic space model for expressing the encoded data which is corresponding to the combination of quantum key states;

performing verifications on the combination of the quantum key states to discard decoherent quantum states meanwhile to avoid using a quantum state which occurs with low probability;

retaining significant information which is on a non-manifold edge, after conformal mapping operations on the encoded data which is corresponding to the combination of quantum key states; and switching the encoded data from a form of linear Symplectic space model into a form of time-variant Jacobi θ function by leveraging Dirac δ-function coupled to a Laplace operator, for achieving the effect of cloaking the quantum key.

13. A quantum computing-threat-resistant method for use in cryptography key-exchanging systems, the method comprising:

a) deriving a proprietary encoded data equivalent to the cryptography key information by leveraging combination of linear-space computing and operation;

b) switching the encoded data of key information to an output data of switched key formed with high-strength security by leveraging homotopy-morphing computing means and key-cloaking computing means; wherein the output data is treated as a first manifold data in a topology space;

c) switching a first manifold data from form of a topology space into form of a Banach space by leveraging Theorema Egregium, so as to derive second manifold data; wherein the first manifold data is formed with a manifold in a topology space and the second manifold data is formed with a manifold in a Banach space;

d) finding the corresponding minimum isomorphic commutative group based on the second manifold data by leveraging an isometric approximation method;

e) performing a smooth topological space verification through the operations of Cauchy inequality to check the convergence on the minimum isomorphic commutative group for confirming the correctness of the data switching from the form in the topology space to the form in the Banach space;

f) performing dimension-reducing process through iterative operations on the commutative group derived from the second manifold data, and switching it from a form in a multi-dimensional Banach space into a form of Peano curve in a one-dimensional space;

g) switching the data in form of a Peano curve to an encrypted form for security transmission according to the data source of the first manifold data, by leveraging partial differential equation of time-variant function or encryption with complex-plane transform; wherein the data in form for security transmission cannot be compromised by inverse operations, can be authenticated, can be verified for completeness of data transmission, and can protect being cracked from functional analysis;

h) after transmitting and receiving the data in form for security transmission, switching the received data from the form of Peano curve into a first geometric data which is in form of a plane by leveraging operations of Riemann integration;

i) expressing the first geometric data in view of a uniformly convex Banach space, and switching it into a form of curve surface as a second geometric data;

j) checking the result of mapping the second geometric data from a form of curved surface to a form of super-reflexive Banach space, and confirming whether the curved-surface switching processes in a uniformly convex space fits duality and reversibility, so as to confirm whether the derived second geometric data is applicable;

k) performing a sub-reflexive Banach operation on the second geometric data for further confirming whether the second geometric data in the form of a curved surface is differentiable; and then performing operations of dimensionality reduction and mapping process with only retaining its weak metric attributes to avoid missing significant information if the second geometric data is differentiable, and then deriving third geometric data in a form of weak-star topology;

l) performing linear operations through a dual vector space with the basis of the Banach space to switch the third geometric data from the form of the weak-star topology to the form of a normed vector space; and m) mapping the data formed in a normed vector space from an inner-product space to a Hilbert space, so as to retrieve the original cryptography key information which is encoded within the form of the first manifold data;

that achieves the effect of avoiding brute-forcing performed with quantum computing.

* * * * *